US011520002B2

(12) United States Patent
Moore et al.

(10) Patent No.: US 11,520,002 B2
(45) Date of Patent: Dec. 6, 2022

(54) REAL-TIME VESSEL NAVIGATION TRACKING

(71) Applicant: Vulcan Technologies LLC, Seattle, WA (US)

(72) Inventors: David Martin Moore, Seattle, WA (US); Mark Alexander Otterlee, Edmonds, WA (US); Patrick Dunagan, Seattle, WA (US); Leina Tani, Seattle, WA (US)

(73) Assignee: Vulcan Technologies LLC, Seattle, WA (US)

(*) Notice: Subject to any disclaimer, the term of this patent is extended or adjusted under 35 U.S.C. 154(b) by 295 days.

(21) Appl. No.: 16/509,150

(22) Filed: Jul. 11, 2019

(65) Prior Publication Data
US 2020/0264268 A1 Aug. 20, 2020

Related U.S. Application Data

(60) Provisional application No. 62/808,209, filed on Feb. 20, 2019.

(51) Int. Cl.
G01S 7/02 (2006.01)
G01S 13/76 (2006.01)
(Continued)

(52) U.S. Cl.
CPC .......... *G01S 7/021* (2013.01); *G01S 13/767* (2013.01); *G01S 13/937* (2020.01);
(Continued)

(58) Field of Classification Search
CPC ...... G01S 7/021; G01S 13/937; G01S 13/767; G08G 5/0082; G08G 5/0078; G08G 5/0073; G08G 3/00; G06K 9/0071; G06K 9/0063
See application file for complete search history.

(56) References Cited

U.S. PATENT DOCUMENTS

2002/0169527 A1* 11/2002 Cline .................. G08G 3/00
701/21
2018/0063467 A1* 3/2018 Gaynor ................ H04N 5/775
(Continued)

FOREIGN PATENT DOCUMENTS

EP 3349123 A2 7/2018

OTHER PUBLICATIONS

International Invitation to Pay Additional Fees mailed Jun. 24, 2020, Patent Application No. PCT/US2020/018896, 15 pages.
(Continued)

*Primary Examiner* — Mary Cheung
(74) *Attorney, Agent, or Firm* — Davis Wright Tremaine LLP

(57) ABSTRACT

A vessel monitoring service obtains transponder data of a vessel operating within a navigable area. In response to obtaining the transponder data of the vessel, the vessel monitoring service evaluates the transponder data and a plurality of travel segments recorded for a plurality of vessels to identify a travel segment to which the transponder data corresponds. The vessel monitoring service updates the travel segment using the transponder data and determine whether the vessel is engaged in an unauthorized activity. If so, the vessel monitoring service provides an indication that the vessel is engaged in the unauthorized activity.

20 Claims, 10 Drawing Sheets

(51) Int. Cl.
*G01S 13/937* (2020.01)
*G08G 5/00* (2006.01)
*G08G 3/00* (2006.01)

(52) U.S. Cl.
CPC ............. *G08G 5/0082* (2013.01); *G08G 3/00* (2013.01); *G08G 5/0073* (2013.01); *G08G 5/0078* (2013.01)

(56) References Cited

U.S. PATENT DOCUMENTS

| | | | |
|---|---|---|---|
| 2020/0018844 A1* | 1/2020 | Fridman | G08G 3/00 |
| 2020/0184828 A1* | 6/2020 | Mazor | G07C 5/006 |
| 2020/0264296 A1* | 8/2020 | Dunagan | G08G 3/00 |

OTHER PUBLICATIONS

International Search Report and Written Opinion dated Aug. 14, 2020, in International Patent Application No. PCT/US2020/018896, filed Feb. 19, 2020, 21 pages.

Le Guillarme et al., "Unsupervised Extraction of Knowledge from S-AIS Data for Maritime Situational Awareness," Proceedings of the 16th International Conference on Information Fusion, Jul. 9, 2013, pp. 2025-2032.

Wikipedia, "Automatic identification system," Jul. 17, 2018, retrieved Aug. 14, 2020, https://en.wikipedia.org/w/index.php?title=Automatic_identification_system&oldid=850663506, 12 pages.

* cited by examiner

REAL-TIME VESSEL NAVIGATION TRACKING

CROSS REFERENCE TO RELATED APPLICATION

This application claims the benefit of U.S. Provisional Patent Application No. 62/808,209, filed Feb. 20, 2019, the disclosure of which is herein incorporated by reference in its entirety.

BACKGROUND

Maritime navigation often relies on each vessel in open water to provide heading, course, and speed information to ensure safe passage and prevent accidents in the open water. However, some vessels will forego providing this information in order to conceal illicit or otherwise unauthorized actions, such as illegal fishing operations that may threaten local wildlife. For instance, a vessel may disable, for a period of time, its transponder to conceal its heading, course, and speed information while it is engaged in an illicit or unauthorized action. Additionally, a vessel may provide fake transponder data to make it more difficult to detect the actual location of the vessel at any given time. Detecting the actual location of a vessel at any given time can be difficult, as the concealed or otherwise fake information can make it difficult to determine a vessel's actions during the period of concealment or of providing fake information. This can prevent rapid identification of illicit or unauthorized actions being undertaken by a vessel, which can prevent any remedial actions from being taken to address such illicit or unauthorized action on the part of the vessel.

BRIEF DESCRIPTION OF THE DRAWINGS

Various techniques will be described with reference to the drawings, in which.

DETAILED DESCRIPTION

Figure 1:
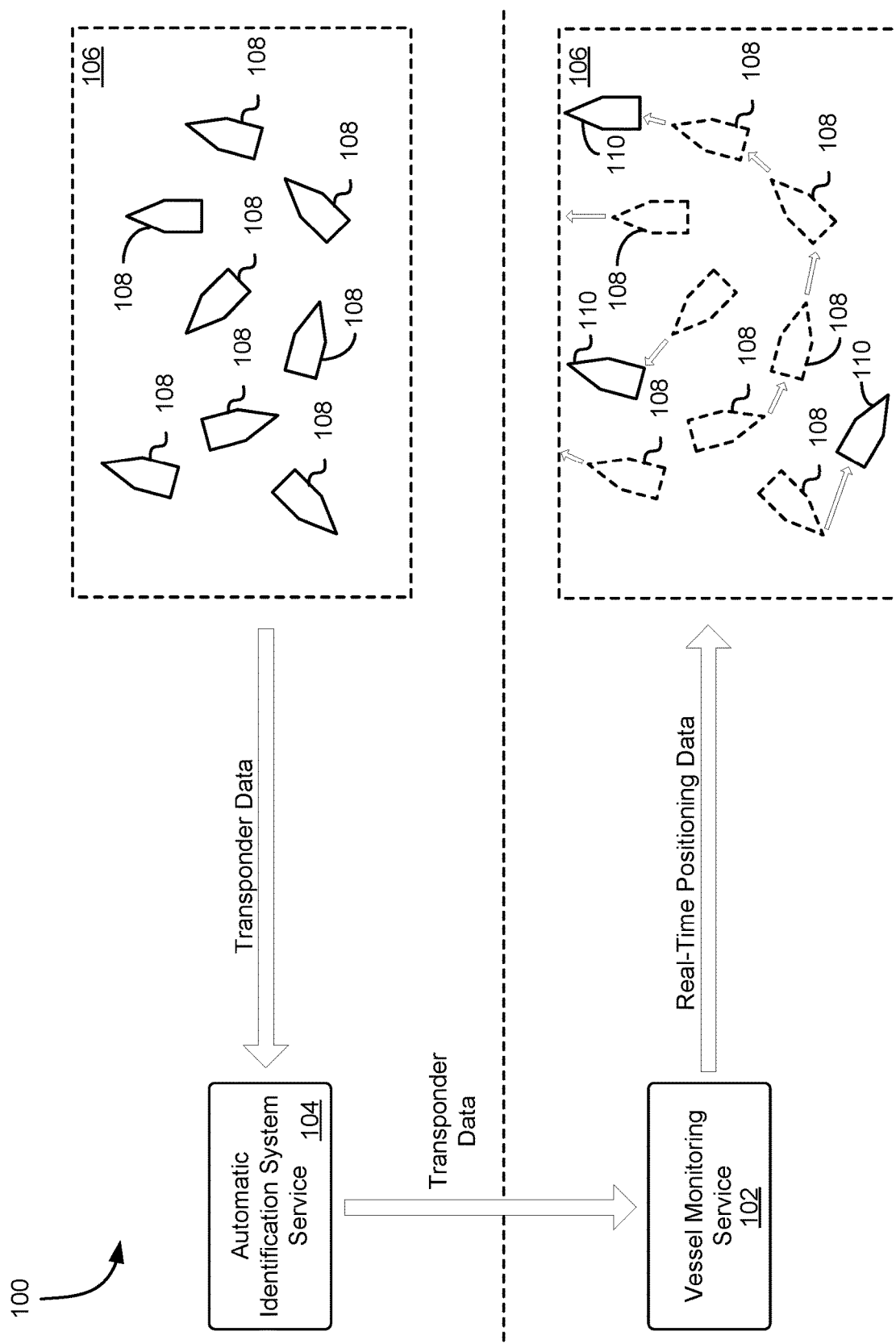
FIG. 1 shows an illustrative example of a system in which various embodiments can be implemented.

Techniques and systems described below relate to a method and systems for discerning vessel activity in real-time in order to generate alerts in the event of illicit, suspicious, or otherwise unauthorized activity. In an example, a vessel monitoring service obtains transponder data for a set of vessels operating within various navigable areas. The transponder data may be obtained via an automatic tracking system such as the automatic identification system (AIS), satellite AIS (S-AIS), and the like. Each vessel may transmit, as transponder data, heading information (e.g., cardinal direction in which the bow of a vessel is pointed, etc.), course information (e.g., cardinal direction in which the vessel is to be steered, etc.), and the speed of the vessel over the navigable area. In an example, the vessel monitoring service generates, for each vessel, a set of travel segments based on transponder data obtained for the vessel over a period of time. These travel segments may be used to determine the travel profile of a vessel over a navigable area over a period of time.

In an example, as the vessel monitoring service obtains transponder data for the vessels operating within the various navigable areas, the vessel monitoring service evaluates the transponder data and any existing travel segments and travel profiles for the previously identified vessels to associate each newly obtained transponder data point with a corresponding travel segment. For instance, the transponder data, under certain circumstances, may be obtained by the vessel monitoring service out of order (e.g., a transponder data point may correspond to a time earlier than another transponder data point previously obtained and processed by the vessel monitoring service). The vessel monitoring service may utilize a machine learning clustering algorithm, such as a k-Nearest Neighbor (KNN) or an expectation maximization clustering algorithm, to associate a particular transponder data point with an existing travel segment. If the transponder data point includes fake vessel information (e.g., fake vessel identifier, etc.), the vessel monitoring service may associate the transponder data point with a unique identifier of the existing travel segment to which it has been clustered into. In an example, as additional transponder data is obtained, the vessel monitoring service utilizes the machine learning clustering algorithm to continue refinement of the travel segments for each vessel. This allows for greater fidelity of vessel positions within navigable areas over time.

In an example, the vessel monitoring service utilizes the travel segments for each vessel to characterize the activity of each vessel at any given time. For instance, the vessel monitoring service may apply a vessel behavior model to each travel segment to identify the activity the vessel may have been engaged in at a given time. Further, as the travel segments are refined over time, the vessel behavior model may be applied to determine the activity a vessel may currently be engaged in. Based on the activity characterization for a travel segment, the vessel monitoring service may determine whether the vessel associated with the travel segment is engaged in an illicit or otherwise unauthorized activity. If so, the vessel monitoring service may generate an alert to indicate that the vessel is likely engaged in this illicit or otherwise unauthorized activity. The vessel monitoring service may transmit the alert to a maritime entity responsible for the enforcement of maritime law and for the protection of life and property at sea.

In an example, the vessel monitoring service utilizes the activity characterization for each travel segment of a vessel, along with publicly-accessible vessel databases, to generate a new database that can be used to identify additional characteristics of the vessel. For instance, the vessel monitoring service may obtain, from a set of publicly-accessible vessel databases, information for each vessel operating within various navigable areas. The information from the set of publicly-accessible vessel databases may specify ownership information for the vessel, the type of vessel, and the like. In an example, the vessel monitoring service generates an entry within a vessel insight database for each vessel identified from the information obtained from the publicly-accessible vessel databases. Further, the vessel monitoring service utilizes the travel segments and activity characterization for each travel segment to determine additional information for each vessel specified in the vessel insight database. For instance, based on the information garnered from the publicly-accessible vessel databases and from the vessel travel segments and activity characterization based on these vessel travel segments, the vessel monitoring service may identify, for a particular vessel: any known affiliates or networks, additional profile classifications (e.g., deep water vs. artisanal fishing, etc.), intentional misinformation provided by the vessel, any discernible patterns of behavior or anomalous behavior, and the like. This new information may be stored within the vessel insight database for each vessel detected within the various navigable areas monitored by the vessel monitoring service.

In an example, the vessel monitoring service can transmit a request to a satellite tracking system to cause an orbiting satellite to track a particular vessel and obtain information about said vessel in real-time. For instance, if the vessel monitoring service determines, based on the activity characterization for a travel segment of a particular vessel, that the particular vessel may be engaged in illicit or otherwise unauthorized activities, the vessel monitoring service may transmit a request to the satellite tracking system to task an orbiting satellite with monitoring the location where the vessel may be located. The request may include information about the vessel including, but not limited to, a unique vessel identifier, the type of vessel, the activity the vessel is purported to be engaged in, and the like. Further, the vessel monitoring service may provide geographic coordinates that may be used to identify the location of the vessel.

In response to the request, the satellite tracking system may update a queue of tasks with an entry corresponding to the tracking request provided by the vessel monitoring service. Each satellite of a fleet of satellites maintained by the satellite tracking system may query the queue to identify a task corresponding to a location within the immediate orbital path of the satellite. A satellite may evaluate the parameters of the task and perform a set of operations at the location specified. This may include obtaining digital photographic images of the location, monitoring actions performed by vessels at the location specified in the entry corresponding to the task over a period of time, and the like. The satellite may provide any data recorded at the location to the satellite tracking system, which may provide this data to the vessel monitoring service for evaluation. Using the data from the satellite, the vessel monitoring service may confirm that the vessel is engaged in the suspected activity and generate an alert to indicate that the vessel is engaged in the suspected activity. Alternatively, if the vessel monitoring service determines, based on the satellite data, that the vessel is not engaged in the suspected activity, the vessel monitoring service may refine the clustering and activity characterization algorithms to improve their accuracy in identifying suspicious vessel activities.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, especially the field of vessel monitoring using transponder data processing, by processing fragmented and/or out-of-sequence vessel transponder data to generate vessel travel segments for individual vessels that can be used for real-time activity characterization for each of these individual vessels. Additionally, techniques described and suggested in the present disclosure improve the efficiency and functioning of satellite tracking systems by allowing the tasking of satellites to perform various operations over underutilized geographic regions, such as the various bodies of water across the globe. Further, satellites may be utilized to generate and transmit maritime data streams to vessel monitoring services to enable these systems to perform activity characterization in real-time using data from these data streams. Moreover, techniques described and suggested in the present disclosure are necessarily rooted in computer technology in order to overcome problems specifically arising with the computing resources required to process erroneous or fraudulent transponder data by setting thresholds for addressing anomalous transponder data while clustering other transponder data into distinct travel segments for individual vessels.

FIG. 1 shows an illustrative example of a system 100 in which various embodiments can be implemented. In the system 100, a vessel monitoring service 102 obtains transponder data corresponding to a set of vessels operating within a navigable area 106 that may be used to determine the real-time position of each of the set of vessels within the navigable area 106 and to determine, based on existing vessel track segments, what activity each of the set of vessels may be engaged in. The vessel monitoring service 102 may comprise a collection of computing resources that collectively operate to monitor vessel activity within navigable areas, such as navigable area 106, and to identify any nefarious or otherwise suspicious activity within these navigable areas. Information generated by the vessel monitoring service 102 via monitoring of vessel activity within navigable areas may be made available to other maritime entities, such as those responsible for the enforcement of applicable laws within the navigable areas and for the protection of life and property within these navigable areas.

In an embodiment, the vessel monitoring service 102 obtains transponder data from each vessel within a navigable area 106 via AIS or S-AIS. Each AIS system may comprise a very high frequency (VHF) transmitter, a set of VHF time-division multiple access (TDMA) receivers, a VHF digital selective calling (DSC) receiver, and standard marine electronic communications links to display and sensor systems. Position and timing information may be derived from an integral or extended global navigation satellite system (e.g., Global Positioning System (GPS), etc.) receiver. Information broadcast via AIS or S-AIS may be obtained by the vessel monitoring service 102 through various communications channels between the vessels and the vessel monitoring service 102. Alternatively, the vessel monitoring service 102 may obtain information broadcast via AIS or S-AIS through a third-party service that collects and maintains transponder data from vessels operating within various navigable areas, such as an AIS service 104. While AIS and S-AIS are utilized extensively throughout the present disclosure for the purpose of illustration, other transponder-based monitoring systems, such as the Vessel Monitoring System (VMS), and other monitoring systems that do not rely on transponder data may be used to track vessels within a navigable area and to obtain transponder data (from transponder-based monitoring systems) and other vessel data (from other monitoring systems) that may be used to determine whether a rendezvous has occurred. The transponder data obtained by the vessel monitoring service 102 may include heading information for the vessel, the course and speed of the vessel in the navigable area 106, the rate of turn for the vessel, the angle of heel, pitch and roll, and destination and estimated time of arrival information for the vessel.

In an embodiment, the vessel monitoring service 102 uses the transponder data points 108 for a variety of vessels detected within the navigable area 106 to generate vessel track segments for each vessel. The vessel track segments may comprise transponder data collected at a first location within the navigable area 106 and transponder data collected at a second location within the navigable area 106 at a time after collection of the transponder data at the first location. These two data points (at the first location and the second location) may correspond to consecutive transponder responses obtained by the vessel monitoring service 102 for a particular vessel. A vessel track may thus include various segments generated using consecutive transponder responses from a vessel within the navigable area 106 and may result in a mapping of vessel movements within the navigable area 106 over a period of time. Alternatively, a vessel track segment may comprise an ordered collection of transponder data points corresponding to different locations within the navigable area 106 that collectively form a travelled path of a particular vessel. The collection of transponder data points may be organized based on a temporal order established based on the time at which each transponder data point was collected.

However, in some instances, the transponder data for a vessel may be fragmented, obtained out-of-sequence, or duplicated. For instance, within a navigable area 106, two or more vessels may each provide transponder data having the same unique vessel identifier. Additionally, or alternatively, the vessel monitoring service 102 may obtain transponder data points 108 that do not follow a temporal order. For instance, the vessel monitoring service 102 may obtain a transponder data point 108 corresponding to the position of a vessel at a time prior to another transponder data point previously processed by the vessel monitoring service 102. Transponder data may also be subject to corruption, whereby one or more transponder data points 108 may be corrupted and missing information usable to determine the position of a corresponding vessel. Further, transponder data that is generated based on GPS coordinates may be subject to GPS position jitter, which may reduce the accuracy in defining the actual position of a vessel at a given time.

In an embodiment, to address these issues, the vessel monitoring service 102 utilizes one or more machine learning algorithms or parameterized rules-based algorithms to assign incoming transponder data from vessels operating in the navigable area 106 to corresponding vessel track segments in real-time. For instance, the vessel monitoring service 102 may use machine learning techniques to determine the vessel track segment for each obtained transponder data point 108. The vessel monitoring service 102 may rely on a variety of thresholds and constraints to enable clustering of the transponder data points 108 into distinct vessel track segments. For instance, the vessel monitoring service 102 may define time-relative thresholds for velocity between consecutive transponder data points 108 for each vessel operating within the navigable area 106 such that the machine learning system of the vessel monitoring service 102 may avoid clustering transponder data points 108 that would result in a vessel having a velocity greater than the threshold for a given time period. The time-relative thresholds may be defined based on the particular vessel type identified via the obtained transponder data or through other methods (e.g., data obtained from publicly-accessible databases, etc.). For instance, the vessel type may be used to define a maximum velocity that a vessel of the vessel type may achieve in the navigable area 106. Thus, if an analysis of consecutive transponder data points 108 results in a velocity that exceeds the threshold, the machine learning system may determine that at least one of the transponder data points 108 belongs to a different vessel track segment.

Additionally, the vessel monitoring service 102 may utilize the machine learning system to remove corrupted transponder data points based on per-field variations in data values. For instance, the machine learning system may evaluate data values corresponding to the heading information for a vessel, the course and speed of a vessel in the navigable area 106, the rate of turn for a vessel, the angle of heel, pitch and roll, and destination and estimated time of arrival information for a vessel to identify any data values that may be outside the bounds of acceptable values within the navigable area 106. Any transponder data points 108 comprising one or more anomalous data values may be discarded by the machine learning system as being corrupted and unusable for clustering transponder data points 108 into vessel track segments for each vessel in the navigable area 106.

In an embodiment, the vessel monitoring service 102 defines thresholds for GPS position jitter permitted within a particular time range between transponder data points 108. For instance, the vessel monitoring service 102 may identify the margin of error for GPS coordinate triangulation from manufacturers of GPS devices often utilized on vessels that may be operating within the navigable area 106. Further, as more transponder data points 108 are obtained for the vessels operating within the navigable area 106, the vessel monitoring service 102 may identify a more representative threshold for GPS position jitter within the navigable area 106 on a per vessel basis. Thus, the machine learning system of the vessel monitoring service 102 may utilize the thresholds for GPS position jitter to better cluster transponder data points 108 from the various vessels operating within the navigable area 106 into corresponding vessel track segments.

In an embodiment, the machine learning system of the vessel monitoring service 102 utilizes the thresholds and constraints described above, along with a clustering algorithm (e.g., KNN clustering, K-Means clustering, expectation maximization algorithms, etc.) to define an initial set of vessel tracking segments for each vessel operating within the navigable area 106. In response to receiving a transponder data point 108 from a vessel within the navigable area 106, the machine learning system may classify the transponder data point 108 by computing, through use of a parameter distance function (e.g., Euclidean Distance, Euclidean Squared Distance, Manhattan Distance, Chebychev Distance, Minkowski Distance, etc.), the distance between the parameters of the transponder data point 108 and the center of each vessel track segment such that the transponder data point 108 is classified as being part of a vessel track segment that is closes to the transponder data point 108. The degree of similarity between different parameters usable as input to the parameter distance function may be determined based on criteria set forth by the vessel monitoring service 102. For instance, the vessel monitoring service 102 may identify a weight for each parameter of a transponder data point 108 such that differences for certain parameters may have greater weight (e.g., greater distance) than differences for other parameters. In an embodiment, the parameter distance function accepts, as inputs, some or all field values of two points in space, where the coordinates of the points correspond to the parameters of the obtained transponder data point 108 and of the clusters corresponding to each vessel track segment. For example, the parameter distance function may calculate the distance between a transponder data point 108 and a vessel track segment by using, as input, the field values of the transponder data point 108 and of the vessel track segment into the function. In one embodiment, the function is defined based on a series of sub-metrics.

As more transponder data points 108 are processed and classified by the machine learning system of the vessel monitoring service 102, the machine learning system may recalculate the center for each vessel tracking segment by taking the mean of all vectors of each vessel tracking segment. Over time, the center for each vessel tracking segment may converge to a particular point such that there is minimal movement between iterations. Other techniques usable to generate and maintain the various vessel tracking segments include K-Medians clustering, mean-shift clustering, density-based spatial clustering of applications with noise (DBSCAN), expectation-maximization (EM) clustering using Gaussian mixture models (GMM), agglomerative hierarchical clustering, and the like. Thus, the machine learning system of the vessel monitoring service 102 may utilize an alternative clustering algorithm for classifying a particular transponder data point 108 as being part of a particular vessel tracking segment even if one or more parameters of the transponder data point 108 do not exactly match the set of parameters of other transponder data points belonging to the vessel tracking segment.

In an embodiment using supervised learning techniques, input data (e.g., data from the various vessel tracking segments, data obtained from external sources that indicates actual position data for vessels operating in the navigable area 106, etc.) may be used to train a machine learning model to further refine the clustering of transponder data points 108 into the various vessel tracking segments for the navigable area 106. For example, data obtained through actual observation of a vessel travelling through the navigable area 106 over a period of time (e.g., satellite images of the vessel, data recorded by other vessels operating within the navigable area 106, etc.) may be used to determine whether the vessel tracking segment generated and maintained by the vessel monitoring service 102 through classification of various transponder data points 108 purportedly from the vessel is accurate. A machine learning system may, at any time, utilize one or more sample vectors to perform one or more simulations to determine whether the functions utilized by the vessel monitoring service 102 to determine which vessel tracking segment a transponder data point 108 is to be assigned are producing correct and accurate results and/or to refine the one or more functions utilized by the vessel monitoring service 102 to produce correct and accurate results. For instance, during initialization of the machine learning system, the vessel monitoring service 102 may provide the machine learning system with one or more sample vectors and analytical results (e.g., desired outcomes) that should be obtained based at least in part on these one or more sample vectors. The machine learning system, based at least in part on this exercise, may adjust the functions utilized by the vessel monitoring service 102 to analyze the vectors corresponding to the various vessel tracking segments.

The machine learning system may receive input from one or more analysts employed by an authority that administers the vessel monitoring service 102 to analyze the results from the one or more analyses performed by vessel monitoring service 102 through use of the one or more functions described above. For instance, an analyst may review the data from a vessel tracking segment for a particular vessel, historical data for the vessel and other vessels operating in the navigable area 106, and other information from other sources, and the one or more vectors generated by the vessel monitoring service 102 to determine whether the vessel tracking segment for the particular vessel accurate represents the actual course of the vessel over a period of time. The analyst may provide his/her input for use in refining the model used to cluster transponder data points 108 into any of the vessel tracking segments. The vector of measurements corresponding to the review performed by the analyst and the desired outcome corresponding to the analyst's input may be used by the machine learning system to update the model used to classify vector inputs. Such may be performed by multiple analysts and/or using multiple vector inputs to provide the machine learning system a sufficient number of sample vector inputs and desired outputs. The machine learning system may adjust the one or more models used by the vessel monitoring service 102 to increase the likelihood that the desired result is obtained in future analyses.

In an embodiment, the vessel monitoring service 102 utilizes the machine learning system to perform real-time activity characterization for a vessel based on newly obtained transponder data points 108 from vessels in the navigable area 106 and the classification of these newly obtained transponder data points 108 into the existing vessel tracking segments. For instance, the segment data for each updated vessel tracking segment may be used as input to the machine learning system and a classification algorithm to build a model that clusters the segment data into activity categories or otherwise predicts the activity category of a segment. In this example embodiment, input data to train a machine learning model such as, the segment data for a particular vessel, historical segment data for other vessels and for the particular vessel operating within the navigable area 106 over time, labeling of segments by domain experts, and other information that may be pertinent to identifying an activity of a vessel may be used. The other information may include information related to activities commonly performed in the navigable area 106 (e.g., fishing, refueling, etc.).

In some embodiments, support vector machine techniques are used to classify regions in Euclidean space as indicative of normal or authorized activity within the navigable area 106 (e.g., refueling, fishing activities, etc.), indicative of illicit or unauthorized activity within the navigable area 106, or indicative of transit through the navigable area 106 unrelated to any activity. This may be used so that measurements are classified in accordance with the region in which the measurement vectors fall. In yet another embodiment, the machine learning system can utilize decision tree learning to determine a decision (classification, regression) tree used to classify vector input indicative of an authorized activity, indicative of an illicit or unauthorized activity, or indicative of normal travel through the navigable area 106 without performance of any activity. As a fictitious illustrative example, if a minimum requirement established by the vessel monitoring service 102 for classifying a segment for a particular vessel as being indicative of an illicit activity is that the vessel remained stationary in a location within the navigable area 106 that has not been historically used for legitimate activities (e.g., fishing, refueling, etc.) and for a period of time that is greater than a particular threshold, the machine learning may result in a decision tree that, at least in part, bifurcates based on vector components indicating whether the amount of time during which the vessel was stationary is greater than a threshold amount of time and whether the location is utilized by other vessels for legitimate purposes. If the input indicates that the vessel has been stationary for a period of time greater than the threshold and that the location is not one in which vessels become stationary for a legitimate purpose, the one or more functions (decision trees) would, in this example, provide a result that the vessel was engaged in an illicit activity at this location for the period of time during which the vessel was stationary. Thus, the machine learning algorithm may adjust the one or more functions if these one or more functions do not indicate that the vessel was engaged in an illicit activity at this location.

In an embodiment, if the vessel monitoring service 102 detects that a vessel has engaged in an illicit or otherwise unauthorized activity, the vessel monitoring service 102 transmits an alert to an entity responsible for the enforcement of applicable law within the navigable area 106 and for the protection of life and property within the navigable area 106. For instance, the vessel monitoring service 102 may provide, to the entity and other entities responsible for regulation or supervision of the navigable area 106, with an interface to enable these entities to identify any illicit activities occurring within the navigable area 106 and the vessels known to have engaged in these illicit activities.

Thus, as the vessel monitoring service 102 obtains new transponder data points 110 for vessels operating within the navigable area 106, the vessel monitoring service 102 may assign each of these new transponder data points 110 to existing vessel tracking segments while filtering through any corrupted or duplicative data. Further, using the new transponder data points 110 and the updated vessel tracking segments, the vessel monitoring service 102 may perform additional activity characterization using the techniques described above to determine whether a vessel is still engaged in an illicit activity or has now engaged in an illicit activity. This contemporaneous information may be provided to an entity responsible for the enforcement of applicable law within the navigable area 106 to enable the entity to respond to the illicit activity and capture the vessels engaged in the illicit activities in the navigable area 106.

Figure 2:
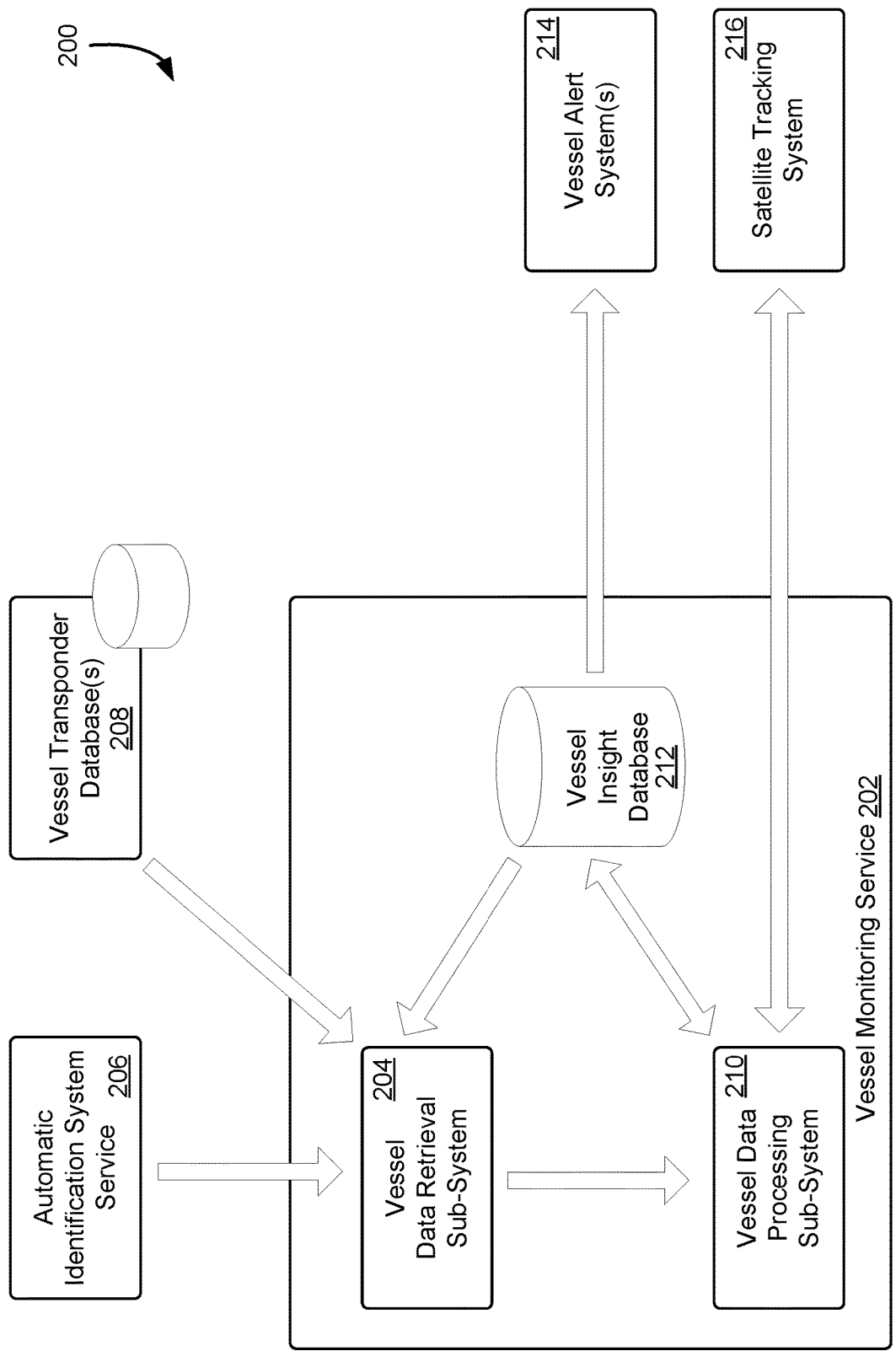
FIG. 2 shows an illustrative example of a system in which a vessel monitoring service obtains vessel transponder data and other data from publicly-accessible vessel databases to perform activity characterization and real-time monitoring of vessels operating in various navigable areas in accordance with at least one embodiment.

FIG. 2 shows an illustrative example of a system 200 in which a vessel monitoring service 202 obtains vessel transponder data and other data from publicly-accessible vessel databases 208 to perform activity characterization and real-time monitoring of vessels operating in various navigable areas in accordance with at least one embodiment. In the system 200, a vessel data retrieval sub-system 204 of the vessel monitoring service 202 obtains transponder data from vessels operating within a navigable area and/or from a third-party service, such as an AIS service 206, that obtains transponder data from various vessels and makes the transponder data available to other entities, such as the vessel monitoring service 202. The vessel data retrieval sub-system 204 is implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein. The vessel data retrieval sub-system 204 may query the AIS service 206 periodically or in response to requests from entities utilizing the vessel monitoring service 202 to initiate monitoring of vessels within a navigable area. Alternatively, the transponder data may be automatically transmitted to the vessel data retrieval sub-system 204 as it is generated by the vessels within the navigable area or is otherwise made available by the AIS service 206.

In an embodiment, the vessel data retrieval sub-system 204 also obtains vessel information for various vessels operating within a navigable area from one or more vessel transponder databases 208 and other databases that comprise publicly accessible information for each vessel that may be operating within the navigable area. The vessel transponder databases 208 and other publicly accessible vessel databases may be maintained by governmental agencies or commercial entities that may record vessel information provided to these entities by owners and operators of various vessels or collected by the governmental agencies through inspection of these vessels. Each entry within a vessel transponder database 208 or other publicly available database comprising vessel information may specify the name of the corresponding vessel, the type of vessel, details regarding ownership of the vessel, country of origin, country where the vessel is registered, and the like. However, the data specified within these databases may be inaccurate and/or incomplete. Further, for certain vessels, entities providing detailed information for these vessels may obscure or misreport the actual vessel information for each of these vessels.

The vessel data retrieval sub-system 204 may provide the transponder data from the various vessels operating within a navigable area and the data garnered from the vessel transponder databases 208 and other publicly accessible databases to a vessel data processing sub-system 210 of the vessel monitoring service 202 for processing. The vessel data processing sub-system 210 is implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein. In an embodiment, the vessel data processing sub-system 210 evaluates the transponder data for the vessels operating within the navigable area to generate vessel track segments that comprise segment data corresponding to transponder data of a unique vessel. Further, the vessel data processing sub-system 210 may utilize the machine learning techniques described above in connection with FIG. 1 to update the vessel track segments and to perform vessel activity characterization based on the segment data for each of the vessel track segments.

In an embodiment, the vessel data processing sub-system 210 also maintains a vessel insight database 212 that includes an entry for each vessel operating within the navigable area. The vessel data processing sub-system 210 may initially include, in an entry for a particular vessel, data garnered from the one or more vessel transponder databases 208 and other publicly accessible databases from which the vessel data retrieval sub-system 204 may query periodically or in response to requests from entities utilizing the vessel monitoring service 202. In an embodiment, the vessel data processing sub-system 210 supplements entries corresponding to vessels operating in the navigable area with data garnered through generation and analysis of the various vessel track segments using the transponder data from these vessels. For instance, the vessel data processing sub-system 210 may update an entry corresponding to a particular vessel in the vessel insight database 212 with information regarding activities performed by the vessel. This information may be generated by the vessel data processing sub-system 210 through performance of activity characterization operations, such as those described above in connection with FIG. 1.

Additionally, in an embodiment, the vessel data processing sub-system 210 updates any information garnered from the one or more vessel transponder databases 208 and other publicly accessible databases based on the analysis of vessel track segments for each vessel operating within the navigable area. For instance, if an entry within the vessel insight database 212 corresponding to a particular vessel specifies baseline information obtained from the vessel transponder databases 208 and other publicly accessible databases, the vessel data processing sub-system 210 may update this baseline information based on an analysis of the vessel track segments for the vessel and any newly obtained transponder data for the vessel. For example, if the baseline information for a vessel specifies that the vessel is utilized for fishing purposes but the vessel data processing sub-system 210 determines, based on analysis of the vessel track segments and transponder data for the vessel, that the vessel is actually engaged in illicit activities, the vessel data processing sub-system 210 may update an entry corresponding to the vessel in the vessel insight database 212 to indicate the actual activities (e.g., illicit activities) that the vessel may be engaged in. Further, the vessel data processing sub-system 210 may indicate, within the entry, that the entity that provided the baseline information to the vessel transponder databases 208 or other publicly accessible databases engaged in the act of providing intentional misinformation for entry within these databases. This may serve as an indication to authorities that the entity providing this baseline information is engaged in obscuring or otherwise misreporting vessel information.

In an embodiment, the vessel data processing sub-system 210 utilizes activity characterization through its machine learning system to identify affiliations or networks among various vessels operating within the navigable area. For instance, the vessel data processing sub-system 210 may cluster vessels performing similar activities into a cluster corresponding to these activities. The vessel data processing sub-system 210 may evaluate the vessel tracking segments for each of these vessels in the cluster to identify any patterns that may be used to identify an affiliation or network among any of the vessels of the cluster. For instance, the vessel data processing sub-system 210 may identify, based on vessel tracking segments for each vessel of the set of vessels in the cluster, any vessels within the cluster that have similar points of origin and destinations over time as being part of an affiliation or network of vessels. Classification of vessels being part of a particular affiliation or network may also be based on the duration of any detected rendezvous or other interaction through intersectionality of vessel tracking segments over a particular period of time. Based on these identified affiliations and networks, the vessel data processing sub-system 210 may identify a common beneficial ownership among the vessels within the affiliations and networks. This common beneficial ownership may differ from the ownership information garnered from the vessel transponder databases 208 and other publicly accessible databases.

Additionally, the vessel data processing sub-system 210 may supplement any baseline information recorded within an entry of the vessel insight database 212 using data garnered through activity characterization using the vessel tracking segments and transponder data for a corresponding vessel. For example, if the baseline information for a vessel obtained from the vessel transponder databases 208 and other publicly accessible databases indicate that the vessel is primarily utilized for fishing purposes, the vessel data processing sub-system 210 may supplement this baseline information to provide additional details regarding the fishing performed by the vessel based on the activity characterization performed for the vessel. This may include determining that the vessel is engaged in deep water fishing as opposed to artisanal fishing within the navigable area based on the activity characterization for the vessel using the vessel tracking segments and transponder data for the vessel analyzed by the vessel data processing sub-system 210. Alternatively, if the vessel data processing sub-system 210 determines that the vessel is engaged in a different activity within the navigable area, the vessel data processing sub-system 210 may replace the baseline information within the entry corresponding to the vessel with the activity identified by the vessel data processing sub-system 210.

In an embodiment, the vessel data processing sub-system 210 also records, within the vessel insight database 212, any patterns or aberrations from known patterns for each vessel operating within the navigable area. For instance, the vessel data processing sub-system 210 may update an entry for a vessel within the vessel insight database 212 with analytical results stemming from analysis of the vessel tracking segments for the vessel. Over time, the entry may include analytical results for various vessel tracking segments that may be used to identify patterns of behavior for the vessel. Further, as these patterns emerge, the vessel data processing sub-system 210 may identify, with greater accuracy, any deviations from these patterns or other anomalies that may be indicative of other activities being performed by the vessel. The vessel data processing sub-system 210 may record these patterns and anomalies within the entry for the vessel. As the vessel data processing sub-system 210 processes newly obtained transponder data for the vessels operating within the navigable area, the vessel data processing sub-system 210 may continue to update the entries within the vessel insight database 212 based on the output of processing the transponder data along with existing vessel tracking segments for these vessels.

The vessel insight database 212 may be accessible by entities authorized to access the vessel monitoring service 202, as well as by one or more vessel alert systems 214, which may use information specified in the entries of the vessel insight database 212 to generate one or more alerts in the event that one or more vessels are engaged in illicit or otherwise unauthorized activity within the navigable area. For instance, if an entry within the vessel insight database 212 specifies that a vessel is engaged in an illicit or otherwise unauthorized activity, the vessel alert system 214 may generate an alert that may be transmitted to other maritime entities, such as those responsible for the enforcement of applicable laws within the navigable areas and for the protection of life and property within these navigable areas. Additionally or alternatively, the vessel data processing sub-system 210 may use the data from the vessel insight database 212 to generate its own alerts, which it may transmit to these other maritime entities.

In an embodiment, based on analysis of the vessel tracking segments and transponder data for the various vessels operating within the navigable area, the vessel data processing sub-system 210 can generate one or more requests to initiate satellite tracking and monitoring of vessels within the navigable area. For instance, if the vessel data processing sub-system 210 determines, based on analysis of vessel tracking segments, transponder data, and information specified in an entry within the vessel insight database 212 for a vessel, that the vessel is likely engaged in an illicit or otherwise unauthorized activity, the vessel data processing sub-system 210 may transmit a request to a satellite tracking system 216 to cause the satellite tracking system 216 to transmit executable instructions to an orbiting satellite for tracking and monitoring of the vessel within the navigable area. The request may include information usable by the satellite tracking system 216 to identify the likely location of the vessel, as well as information related to the illicit or other unauthorized activity the vessel may be engaged in. The request may further specify what kind of monitoring is to be performed (e.g., imagery collection, etc.) on the vessel. The satellite tracking system 216 may comprise a collection of computing resources that collectively operate to manage and task satellites from a fleet of orbiting satellites to perform various operations including, but not limited to, tracking movements of a vessel within a navigable area, recording vessel movements within a navigable area, recording photographic images of the vessel within the navigable area over a period of time, and the like.

Figure 3:
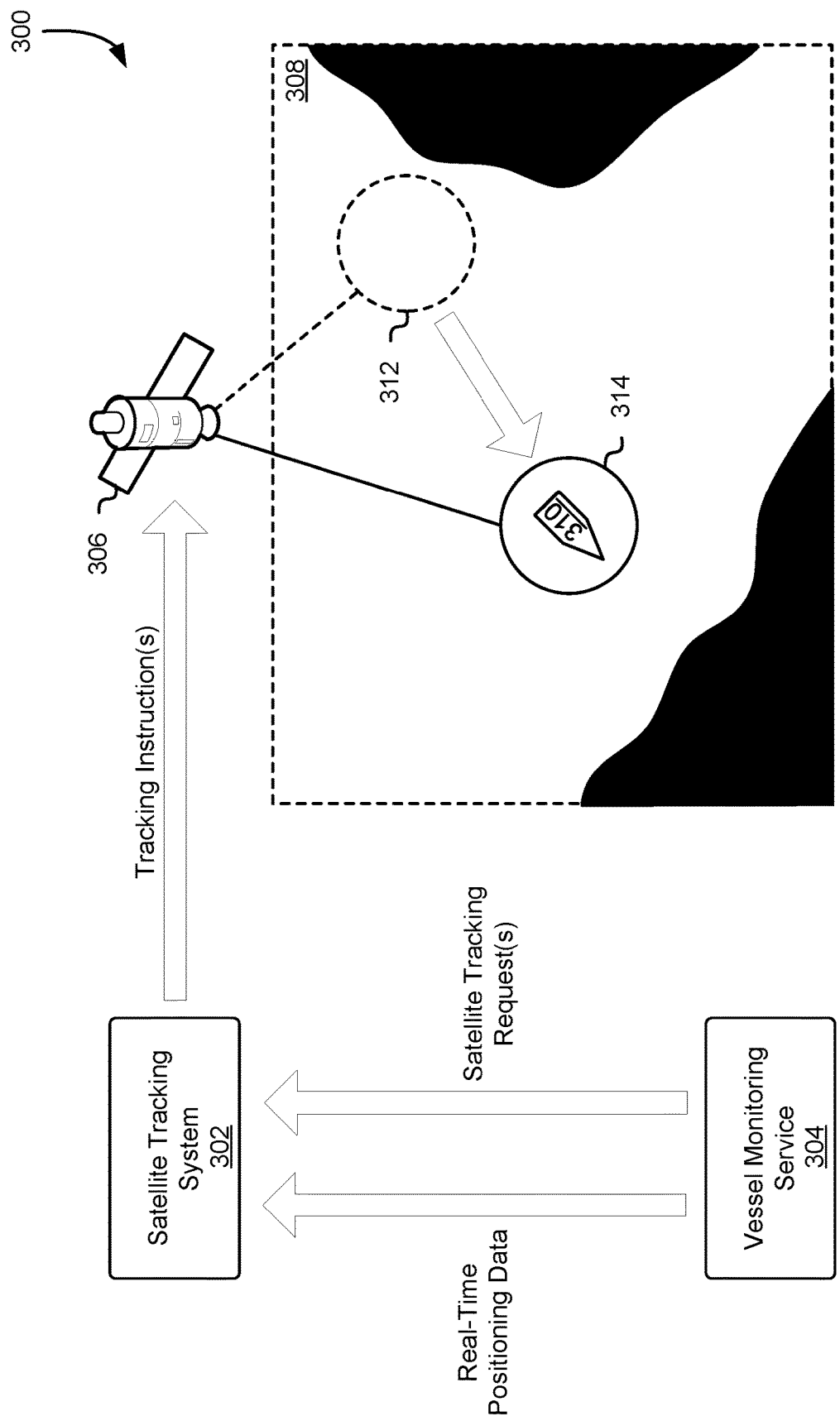
FIG. 3 shows an illustrative example of a system in which a satellite tracking system transmits executable instructions to a satellite to track and monitor a vessel within a navigable area in response to a tracking request from a vessel monitoring service in accordance with at least one embodiment.

FIG. 3 shows an illustrative example of a system 300 in which a satellite tracking system 302 transmits executable instructions to a satellite to track and monitor a vessel 310 within a navigable area 308 in response to a tracking request from a vessel monitoring service 304 in accordance with at least one embodiment. In the system 300, a vessel monitoring service 304 transmits a satellite tracking request to a satellite tracking system 302 to initiate satellite monitoring and tracking of a particular vessel 310 operating within a navigable area 308. The satellite tracking request from the vessel monitoring service 304 may specify the real-time positioning data for the vessel 310 that is to be monitored and tracked by the satellite tracking system 302. This real-time positioning data may include latitude and longitude coordinates for the vessel 310, as well as information specifying the time at which the vessel 310 was at the provided coordinates and information specifying the last known heading of the vessel 310. This real-time positioning data may be used by the satellite tracking system 302 to identify the likely location of the vessel 310 at any given time.

In addition to the real-time positioning data, the request to the satellite tracking system 302 may specify what kind of monitoring and tracking is to be performed by the satellite tracking system 302 for the specified vessel 310. For instance, the vessel monitoring service 304 may specify, in the request, that a satellite 306 is to obtain photographic images of the vessel 310 within the navigable area 308 if the satellite 306 detects any activity from the vessel 310 within the navigable area 308. The request may also specify the length of time during which the satellite 306 is to monitor and track the vessel 310 within the navigable area 308. In an embodiment, the request includes executable instructions that cause the satellite tracking system 302 to perform analysis of data obtained from a satellite 306 to identify vessels within the area of interest 314 within the navigable area 308 and to identify any suspicious (e.g., illicit or otherwise unauthorized) activity within the area of interest 314. The executable instructions may also be transmitted to the satellite 306, which may cause the satellite 306 to stream the data collected by the satellite 306 to the vessel monitoring service 304 for processing.

In an embodiment, in response to the request from the vessel monitoring service 304, the satellite tracking system 302 generates an entry in a queue corresponding to the request. The queue may be accessible by each satellite 306 of a fleet of satellites orbiting the Earth through various orbits. The entry within the queue may specify the last known location of the vessel 310 that is to be monitored and tracked by a satellite 306, as well as any executable instructions that, if executed by the satellite 306, cause the satellite 306 to perform a set of operations for tracking and monitoring the vessel 310 within the area of interest 314 defined in the entry. Each satellite 306 of the fleet of satellites may periodically query the queue to identify any pending requests and determine, based on the coordinates of the area of interest 314 and the last known location of the vessel 310, whether to process the request from the queue. For instance, a satellite 306 monitoring a different area of interest 312 may determine that its orbit will intersect with the area of interest 314 identified in the entry within a threshold period of time (e.g., within a set number of seconds, a set number of minutes, etc.) and that it is capable of perform the operations specified in the request. If a satellite 306 accepts a request from the queue, the satellite 306 may obtain the parameters of the request and any executable instructions from the satellite tracking system 302 and remove the entry from the queue to prevent duplicative efforts in tracking and monitoring the vessel 310 and/or the area of interest 314.

If a satellite 306 accepts a request from the queue, the satellite 306 may transition from its location over a first area of interest 312 to a second area of interest 314 corresponding to the coordinates specified in the request from the vessel monitoring service 304. The satellite 306 may execute any executable instructions included in the request and initiate tracking and monitoring of the vessel 310 within the second area of interest 314 if the satellite 306 is able to identify the vessel 310 within the second area of interest 314. If the satellite 306 determines that the vessel 310 is within the second area of interest 314, the satellite 306 may record photographic images of the vessel 310, as well as any other data pertinent to identification of the vessel 310 and of any activities that may be conducted by the vessel 310. In some instances, the satellite 306 may track movements of the vessel 310 such that the satellite 306 may change its heading based on any heading changes of the vessel 310. As an illustrative example, the VMS may provide continual updates regarding the movements of the vessel 310 to the satellite tracking system 302. In response to these updates, the satellite tracking system 302 may provide updated information to the satellite 306, which may cause the satellite 306 to change its heading in accordance with any heading changes of the vessel 310. This enables the satellite 306 to follow the heading of the vessel 310 over the navigable area for a period of time defined in the request. Alternatively, based on the parameters of the request, the satellite 306 may monitor the second area of interest 314 and record data for any vessels, including vessel 310, that may enter into the second area of interest 314. For instance, if the satellite 306 detects that a vessel has entered into the second area of interest 314, the satellite 306 may record data related to the vessel while the vessel is within the second area of interest 314. This data may include photographic images of the vessel, synthetic aperture radar (SAR) readings, radio frequency (RF) mappings, and/or other types of information that may be obtained by the satellite 306.

As the satellite 306 obtains data collected through monitoring and tracking of the vessel 310 or of other vessels that may have entered into the area of interest 314, the satellite 306 may transmit this data to the satellite tracking system 302, which may provide the data to the vessel monitoring service 304 to fulfill the request. In an embodiment, the satellite 306 streams the data, over a communications session with the vessel monitoring service 304, to the vessel monitoring service 304 in real-time. The vessel monitoring service 304 may process the data obtained from the satellite 306 to determine whether a vessel 310 is engaged in an illicit or unauthorized activity. For instance, the vessel monitoring service 304, using the machine learning system described above, may evaluate any images or other data obtained from the satellite 306 to determine whether measurement vectors corresponding to characteristics of the images or other data fall within a classification corresponding to performance of illicit or unauthorized activities. The classification of the measurement vectors for the data obtained from the satellite 306 may be used to enhance the machine learning model utilized to identify any illicit or otherwise unauthorized activities performed by vessels within the navigable area 308.

In an embodiment, the vessel monitoring service 304 provides executable instructions that, if executed by a satellite 306, causes the satellite 306 to evaluate data obtained through monitoring of a vessel 310 and/or an area of interest 314 and through tracking of the vessel 310 to determine what activity the vessel 310 may be engaged in. The satellite 306 may provide the output of this analysis to the satellite tracking system 302 or to the vessel monitoring service 304 to fulfill the request. This may have the additional benefit of reducing the bandwidth required in transmitting data to the vessel monitoring service 304 from the satellite 306 as the satellite 306 continues to monitor and track the vessel 310 within the navigable area 308.

Figure 4:
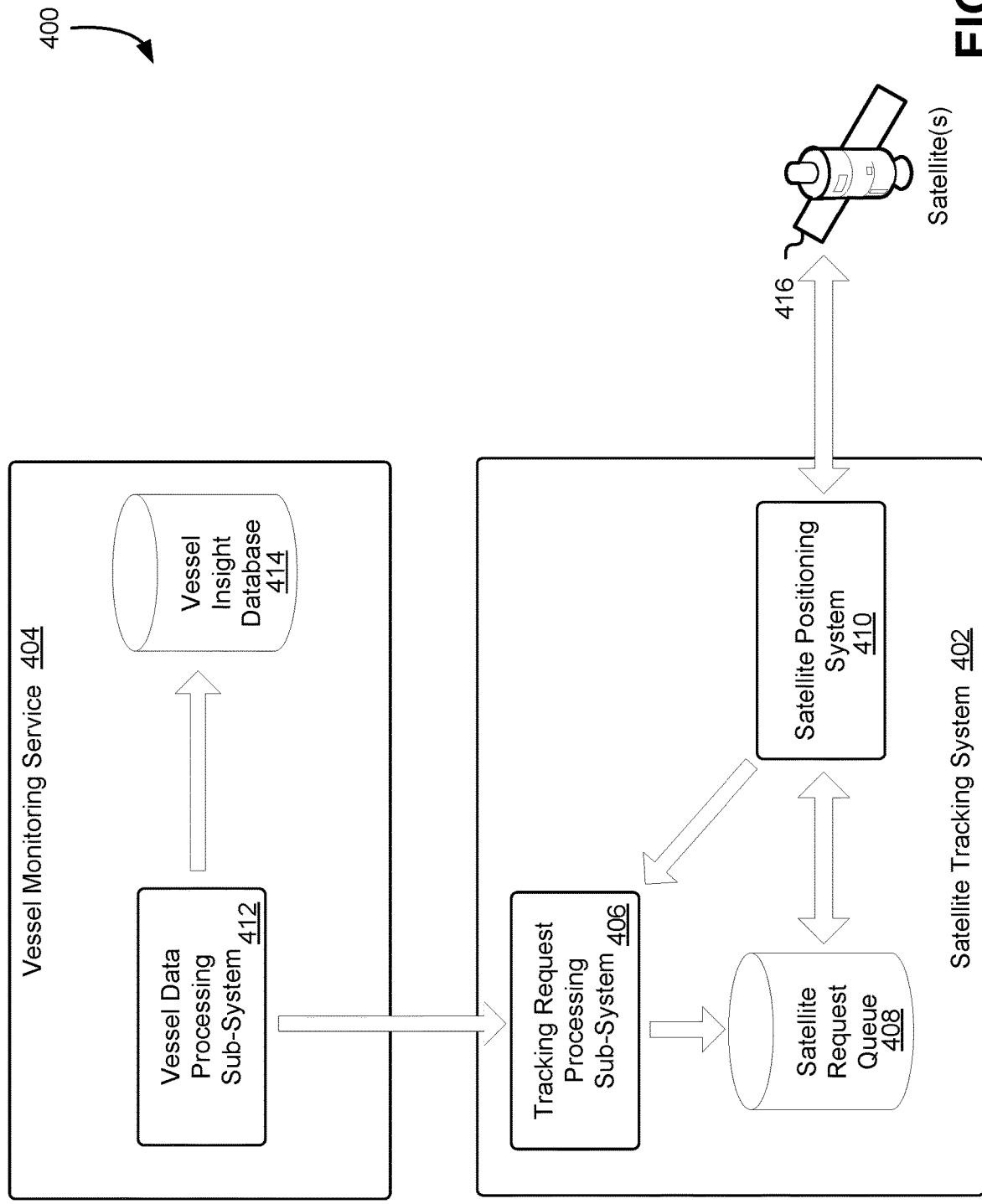
FIG. 4 shows an illustrative example of a system in which a satellite tracking system updates a queue accessible by a fleet of satellites to incorporate requests from a vessel monitoring service to monitor and track a vessel operating within a navigable area in accordance with at least one embodiment.

FIG. 4 shows an illustrative example of a system 400 in which a satellite tracking system 402 updates a queue 408 accessible by a fleet of satellites 416 to incorporate requests from a vessel monitoring service 404 to monitor and track a vessel operating within a navigable area in accordance with at least one embodiment. In the system 400, a vessel data processing sub-system 412 transmits a request to a tracking request processing sub-system 406 of the satellite tracking system 402 to initiate monitoring and tracking of a vessel and/or to initiate monitoring of a particular area of interest within a navigable area. The vessel data processing sub-system 412 may be similar to the vessel data processing sub-system 210 described above in connection with FIG. 2. The tracking request processing sub-system 406 is implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein.

As noted above, the vessel data processing sub-system 412 may process incoming transponder data for various vessels operating in a navigable area, as well as existing vessel tracking segments for each of these vessels, to perform activity characterization for each vessel. The vessel data processing sub-system 412 may record the output of the activity characterization process, as well as any new transponder data and the updated vessel tracking segments, to the vessel insight database 414. In an embodiment, if the vessel data processing sub-system 412 determines that a vessel may be engaged in an illicit or otherwise unauthorized activity, the vessel data processing sub-system 412 transmits a request to the tracking request processing sub-system 406 of the satellite tracking system 402 to initiate tracking and monitoring of the vessel and/or of a particular area of interest where the purported illicit or otherwise unauthorized activity is occurring or has occurred. The request may specify the coordinates of the area of interest or of the last known location of the vessel. Additionally, the request may specify heading and course information for the vessel, which may be determined by the vessel data processing sub-system 412 based on the vessel tracking segments and transponder data of the vessel.

In an embodiment, the request from the vessel data processing sub-system 412 can also include executable instructions that, if executed by a satellite of the fleet of satellites 416, cause the satellite to perform a set of operations related to the tracking and monitoring of a vessel or of a particular area of interest within the navigable area. For instance, the executable instructions may cause a satellite to evaluate data obtained through monitoring of a vessel and/or an area of interest and through tracking of the vessel to determine what activity the vessel may be engaged in. The satellite may provide the output of this analysis to the satellite tracking system 402 or to the vessel data processing sub-system 412 to fulfill the request.

In response to the request from the vessel data processing sub-system 412, the tracking request processing sub-system 406 of the satellite tracking system 402 may evaluate the request to identify a set of parameters of the request that may be used by each satellite of the fleet of satellites 416 to determine whether it may process the request. For instance, the tracking request processing sub-system 406 may identify, from the request, the geographic coordinates of the vessel or of the area of interest that is to be monitored. Further, the tracking request processing sub-system 406 may identify any executable instructions that are to be executed by a satellite processing the request. The tracking request processing sub-system 406 may determine the system requirements for execution of the executable instructions, which may be used by a satellite to determine whether it can execute these executable instructions. Further, the tracking request processing sub-system 406 may identify, from the request, the data requested by the vessel data processing sub-system 412 and the requirements (e.g., resolution, fidelity, etc.) for the data that is to be obtained. This additional information may be used by each satellite to determine whether it can process the request.

The tracking request processing sub-system 406 may generate an entry within a satellite request queue 408 of the satellite tracking system 402 to make the request from the vessel data processing sub-system 412 available for processing. The entry in the satellite request queue 408 may include the parameters of the request, any executable instructions associated with the request, any system requirements for execution of the executable instructions, and parameters of the data requested by the vessel data processing sub-system 412. In an embodiment, each satellite of a fleet of satellites 416 determines what requests are available in the queue 408 through a satellite positioning system 410 of the satellite tracking system 402. The satellite positioning system 410 is implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein.

The satellite positioning system 410 may obtain, from each satellite of the fleet of satellites 416, orbital positioning data of the satellite, as well as heading and course information for the satellite. This data and information may be used to determine the areas that may be monitored by the satellite at any given time. Further, the satellite positioning system 410 may obtain indications from satellites as to their availability for performance of operations. The satellite positioning system 410 may maintain a database that comprises an entry for each satellite of the fleet of satellites 416. Each entry may include the specifications of the corresponding satellite, including but not limited to the system specifications for the satellite, the data collection capabilities of the satellite, and the like. In an embodiment, the satellite positioning system 410 may evaluate the data and information provided by the various satellites of the fleet of satellites 416, as well as the entries corresponding to each of these satellites, to identify a satellite that may fulfill a request specified in the queue 408.

The satellite positioning system 410 may transmit the request from the satellite request queue 408 to the designated satellite to cause the satellite to perform one or more operations for fulfillment of the request. As the satellite generates data through monitoring and tracking of a vessel and/or through monitoring of a particular area of interest, the satellite may transmit this data to the satellite positioning system 410. The satellite positioning system 410 may provide the data to the tracking request processing sub-system 406, which may provide the data to the vessel data processing sub-system 412 or otherwise make the data available to the vessel data processing sub-system 412. The vessel data processing sub-system 412 may process the data obtained from the satellite to determine whether a vessel is engaged in an illicit or unauthorized activity. For instance, the vessel data processing sub-system 412, using the machine learning system described above, may evaluate any images or other data obtained from the satellite to determine whether measurement vectors corresponding to characteristics of the images or other data fall within a classification corresponding to performance of illicit or unauthorized activities. In an alternative embodiment, the satellite transmits the data to the vessel data processing sub-system 412 instead of the satellite positioning system 410.

Figure 5:
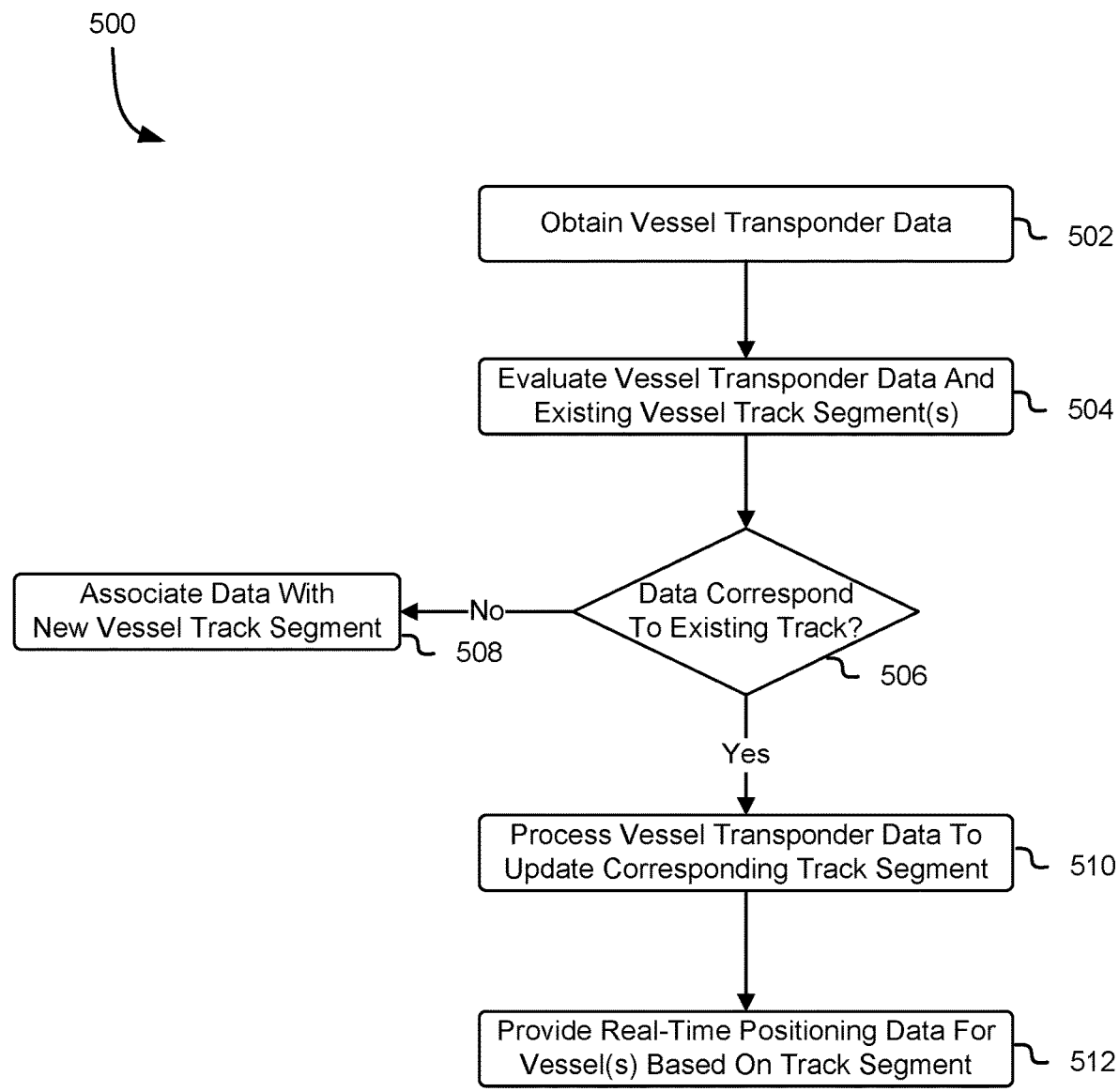
FIG. 5 shows an illustrative example of a process for processing incoming transponder data and existing vessel track segments to update the existing track segments and obtain real-time positioning data for vessels based on the updated track segments.

FIG. 5 shows an illustrative example of a process 500 for processing incoming transponder data and existing vessel track segments to update the existing track segments and obtain real-time positioning data for vessels based on the updated track segments. The process 500 may be performed by a vessel data processing sub-system of a vessel monitoring service, which may utilize a machine learning system to evaluate and classify incoming transponder data into any of the various vessel tracking segments for vessels operating within a particular navigable area. At any time, the vessel data processing sub-system of the vessel monitoring service may obtain 502 transponder data for one or more vessels operating in a navigable area monitored by the vessel monitoring service. In some instances, the transponder data for a vessel may be fragmented, obtained out-of-sequence, or duplicated. For instance, within a navigable area, two or more vessels may each provide transponder data having the same unique vessel identifier. Additionally, or alternatively, the vessel data processing sub-system may obtain transponder data points that do not follow a temporal order. For instance, the vessel data processing sub-system may obtain a transponder data point corresponding to the position of a vessel at a time prior to another transponder data point previously processed by the vessel data processing sub-system. Transponder data may also be subject to corruption, whereby one or more transponder data points may be corrupted and missing information usable to determine the position of a corresponding vessel. Further, transponder data that is generated based on GPS coordinates may be subject to GPS position jitter, which may reduce the accuracy in defining the actual position of a vessel at a given time.

In response to obtaining vessel transponder data for one or more vessels operating within a navigable area, the vessel data processing sub-system may evaluate 504 the obtained vessel transponder data and any existing vessel tracking segments to determine 506 whether the obtained vessel transponder data corresponds to existing vessel tracking segments of vessels operating within the navigable area. As noted above, the vessel data processing sub-system may utilize a machine learning system that may utilize one or more machine learning algorithms or a parameterized rules-based system to assign incoming transponder data from vessels operating in the navigable area to corresponding vessel track segments in real-time. For instance, the vessel data processing sub-system may use machine learning techniques to determine the vessel track segment for each obtained transponder data point. The vessel data processing sub-system may rely on a variety of thresholds and constraints to enable clustering of the transponder data points into distinct vessel track segments. For instance, the vessel data processing sub-system may define time-relative thresholds for velocity between consecutive transponder data points for each vessel operating within the navigable area such that the machine learning system of the vessel monitoring service may avoid clustering transponder data points that would result in a vessel having a velocity greater than the threshold for a given time period. Additionally, the vessel data processing sub-system may utilize the machine learning system to remove corrupted transponder data points based on per-field variations in data values. In an embodiment, the vessel monitoring service defines thresholds for GPS position jitter permitted within a particular time range between transponder data points. For instance, the vessel monitoring service may identify the margin of error for GPS coordinate triangulation from manufacturers of GPS devices often utilized on vessels that may be operating within the navigable area. Further, as more transponder data points are obtained for the vessels operating within the navigable area, the vessel data processing sub-system may identify a more representative threshold for GPS position jitter within the navigable area on a per vessel basis. Thus, the machine learning system of the vessel monitoring service may utilize the thresholds for GPS position jitter to better cluster transponder data points from the various vessels operating within the navigable area into corresponding vessel track segments.

Using the machine learning system described above, the vessel data processing sub-system may classify the obtained transponder data as being associated with an existing vessel tracking segment or as not being associated with any existing vessel tracking segment. If the transponder data does not correspond to an existing vessel tracking segment, the vessel data processing sub-system may associate 508 the transponder data with a new vessel tracking segment. For instance, the vessel data processing sub-system, through the machine learning system, may generate a new cluster corresponding to this newly identified segment such that this newly identified segment may be used in the analysis of future transponder data. However, if the vessel data processing sub-system determines that the transponder data corresponds to an existing vessel tracking segment, the vessel data processing sub-system may process 510 the vessel transponder data to update the corresponding vessel tracking segment.

For instance, as more transponder data points are processed and classified by the machine learning system of the vessel data processing sub-system, the machine learning system may recalculate the center for each vessel tracking segment by taking the mean of all vectors of each vessel tracking segment. Over time, the center for each vessel tracking segment may converge to a particular point such that there is minimal movement between iterations. Other techniques usable to generate and maintain the various vessel tracking segments include K-Medians clustering, mean-shift clustering, DBSCAN, EM clustering using GMM, agglomerative hierarchical clustering, and the like. Thus, the machine learning system of the vessel data processing sub-system may utilize a clustering algorithm for classifying a particular transponder data point as being part of a particular vessel tracking segment even if one or more parameters of the transponder data point do not exactly match the set of parameters of other transponder data points belonging to the vessel tracking segment.

The vessel data processing sub-system may further provide 512 real-time positioning data for one or more vessels based on the corresponding updated vessel tracking segments for these one or more vessels. For instance, the vessel data processing sub-system may update an interface utilized by customers of the vessel monitoring service to incorporate the real-time positioning data for each vessel as determined by the vessel data processing sub-system through processing of incoming transponder data points and through the updating of existing vessel track segments for each vessel. Additionally, or alternatively, the vessel data processing sub-system may utilize the real-time positioning data for a vessel, along with its corresponding vessel tracking segments, to perform activity characterization usable to identify one or more activities that the vessel may be engaged in in real-time, as described in greater detail in connection with FIG. 6.

Figure 6:
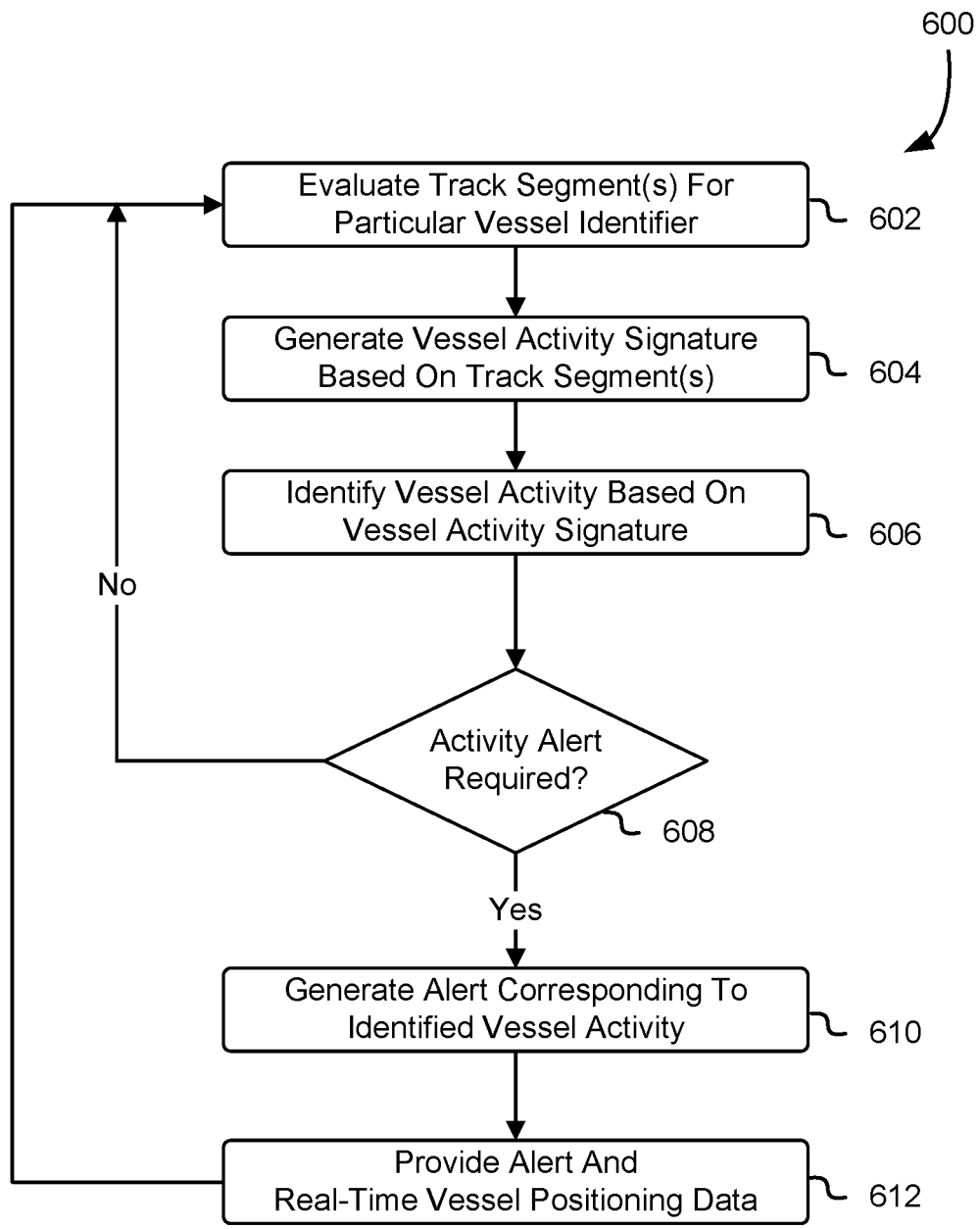
FIG. 6 shows an illustrative example of a process for performing activity characterization for vessels within various navigable areas based on track segments for each of the vessels in accordance with at least one embodiment.

FIG. 6 shows an illustrative example of a process 600 for performing activity characterization for vessels within various navigable areas based on track segments for each of the vessels in accordance with at least one embodiment. The process 600 may be performed by the vessel data processing sub-system in conjunction with a machine learning system of the vessel monitoring service. In an embodiment, the vessel data processing sub-system evaluates 602 the vessel tracking segments for a particular vessel identifier (e.g., a particular vessel within a navigable area) to generate 604 a vessel activity signature corresponding to an activity the vessel is purportedly engaged in. For instance, the vessel data processing sub-system may utilize the machine learning system to perform real-time activity characterization for a vessel based on newly obtained transponder data points from vessels in the navigable area and the classification of these newly obtained transponder data points into the existing vessel tracking segments. For instance, the segment data for each updated vessel tracking segment may be used as input to the machine learning system and a classification algorithm to build a model that clusters the segment data into activity categories. In this example embodiment, input data to train a machine learning model such as, the segment data for a particular vessel, historical segment data for other vessels and for the particular vessel operating within the navigable area over time, and other information that may be pertinent to identifying an activity of a vessel may be used. The other information may include information related to activities commonly performed in the navigable area.

Using the vessel activity signature, the vessel data processing sub-system may identify 606 the activity that a vessel may have been engaged in or is currently engaged in within the navigable area. For instance, the vessel data processing sub-system may utilize support vector machine techniques to classify regions in Euclidean space as indicative of normal or authorized activity within the navigable area, indicative of illicit or unauthorized activity within the navigable area, or indicative of transit through the navigable area unrelated to any activity. This may be used so that vessel activity signatures are classified in accordance with the region in which the measurement vectors fall. In another embodiment, the machine learning system can utilize decision tree learning to determine a decision tree used to classify vector input indicative of an authorized activity, indicative of an illicit or unauthorized activity, or indicative of normal travel through the navigable area without performance of any activity.

Based on the identified vessel activity that the vessel may have been or is currently engaged in, the vessel processing sub-system may determine 608 whether an activity alert is required for notification of other entities that the activity has occurred or is currently being performed. For instance, if the vessel data processing sub-system determines that the vessel is engaged in an authorized activity or is simply transiting through the navigable area, the vessel data processing sub-system may forego generating an activity alert and continue to evaluate 602 the tracking segments for the vessel as these tracking segments are updated through processing of new transponder data. However, if the vessel data processing sub-system determines that an activity alert is required based on the identified activity, the vessel data processing sub-system may generate 610 an alert corresponding to the identified vessel activity. For instance, the vessel data processing sub-system may generate an alert that may be transmitted to other maritime entities, such as those responsible for the enforcement of applicable laws within the navigable areas and for the protection of life and property within these navigable areas. This alert may specify at least an identifier of the vessel, the activity the vessel has been engaged in, the location where the activity is occurring or has occurred, and heading/course information for the vessel based on the tracking segments for the vessel. The vessel data processing sub-system may provide 612 this alert and real-time positioning data for the vessel to these other maritime entities and continue evaluating updated tracking segments for the vessel as these are updated using new transponder data for the vessel.

Figure 7:
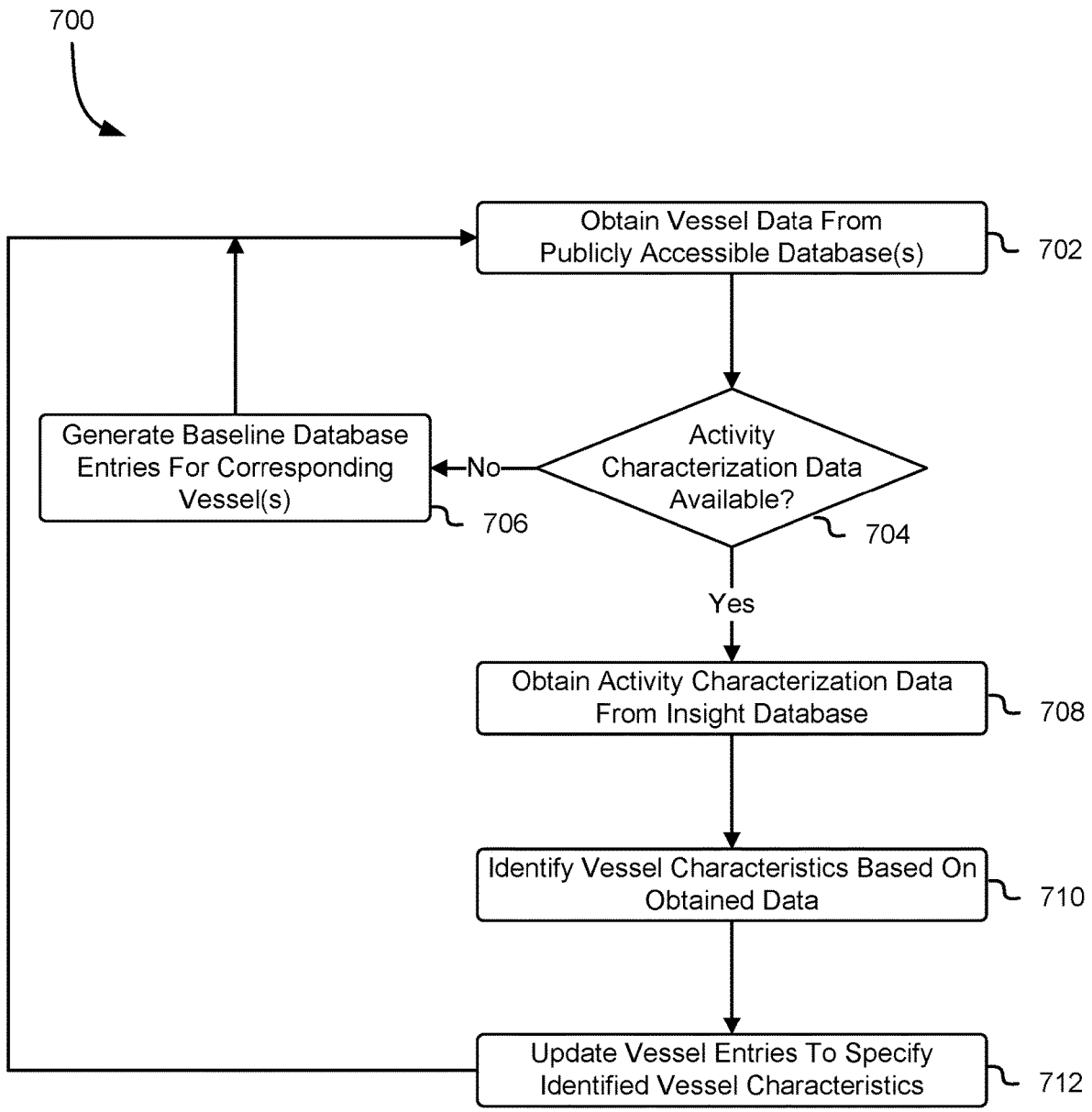
FIG. 7 shows an illustrative example of a process for generating and maintaining a vessel insight database comprising information garnered from publicly-accessible vessel databases and from activity characterization performed using vessel track segments for each vessel in accordance with at least one embodiment.

FIG. 7 shows an illustrative example of a process 700 for generating and maintaining a vessel insight database comprising information garnered from publicly-accessible vessel databases and from activity characterization performed using vessel track segments for each vessel in accordance with at least one embodiment. The process 700 may be performed by the vessel data processing sub-system of the vessel monitoring service, which may use activity characterization data generated through the process 600 described above in connection with FIG. 6 and data from publicly accessible databases for vessels operating within a navigable area to update baseline vessel entries within a vessel insight database. In an embodiment, the vessel data processing sub-system obtains 702 vessel data from one or more publicly accessible databases. The publicly accessible vessel databases may be maintained by governmental agencies or commercial entities that may record vessel information provided to these entities by owners and operators of various vessels or collected by the governmental agencies through inspection of these vessels. Each entry within a publicly available database comprising vessel information may specify the name of the corresponding vessel, the type of vessel, details regarding ownership of the vessel, country of origin, country where the vessel is registered, and the like. However, the data specified within these databases may be inaccurate and/or incomplete. Further, for certain vessels, entities providing detailed information for these vessels may obscure or misreport the actual vessel information for each of these vessels.

The vessel data processing sub-system may determine 704, for each vessel for which vessel data was obtained, whether activity characterization data for the vessel is available. For instance, the vessel data processing sub-system may query the vessel insight database maintained by the vessel monitoring service to determine whether an entry corresponding to a vessel specifies activity characterization data and/or vessel tracking segment data that may be used to generate activity characterization data. If the vessel data processing sub-system determines that no activity characterization data is available for a particular vessel, the vessel data processing sub-system may generate 706 a baseline database entry within the vessel insight database corresponding to the vessel. This baseline database entry may incorporate the data obtained from the publicly accessible databases. If activity characterization data become available at a later time, the vessel data processing sub-system may update this database entry as described below.

If the vessel data processing sub-system determines that activity characterization data is available for a particular vessel, the vessel data processing sub-system may obtain 708 the activity characterization data from the vessel insight database and process the baseline data and the activity characterization data to identify 710 a set of vessel characteristics that may be used to update the vessel entry within the vessel insight database. For instance, if an entry within the vessel insight database corresponding to a particular vessel specifies baseline information obtained from the vessel transponder databases and other publicly accessible databases, the vessel data processing sub-system may analyze the vessel track segments for the vessel and any newly obtained transponder data for the vessel to identify the activity that the vessel is actually engaged in. For example, if the baseline information for a vessel specifies that the vessel is utilized for fishing purposes but the vessel data processing sub-system determines, based on analysis of the vessel track segments and transponder data for the vessel, that the vessel is actually engaged in illicit activities, the vessel data processing sub-system may update 712 an entry corresponding to the vessel in the vessel insight database to indicate the actual activities that the vessel may be engaged in. Further, the vessel data processing sub-system may indicate, within the entry, that the entity that provided the baseline information to the vessel transponder databases or other publicly accessible databases engaged in the act of providing intentional misinformation for entry within these databases.

Additionally, the vessel data processing sub-system may use activity characterization through its machine learning system to identify affiliations or networks among various vessels operating within the navigable area. For instance, the vessel data processing sub-system may cluster vessels performing similar activities into a cluster corresponding to these activities. The vessel data processing sub-system may evaluate the vessel tracking segments for each of these vessels in the cluster to identify any patterns that may be used to identify an affiliation or network among any of the vessels of the cluster. Classification of vessels being part of a particular affiliation or network may also be based on the duration of any detected rendezvous or other interaction through intersectionality of vessel tracking segments over a particular period of time. Based on these identified affiliations and networks, the vessel data processing sub-system may identify a common beneficial ownership among the vessels within the affiliations and networks.

As another example, the vessel data processing sub-system may supplement any baseline information recorded within an entry of the vessel insight database using data garnered through activity characterization using the vessel tracking segments and transponder data for a corresponding vessel. For example, if the baseline information for a vessel obtained from the vessel transponder databases and other publicly accessible databases indicate that the vessel is primarily utilized for fishing purposes, the vessel data processing sub-system may supplement this baseline information to provide additional details regarding the fishing performed by the vessel based on the activity characterization performed for the vessel. Alternatively, if the vessel data processing sub-system determines that the vessel is engaged in a different activity within the navigable area, the vessel data processing sub-system may replace the baseline information within the entry corresponding to the vessel with the activity identified by the vessel data processing sub-system.

The vessel data processing sub-system may also record, within the vessel insight database, any patterns or aberrations from known patterns for each vessel operating within the navigable area. Over time, the entry may include analytical results for various vessel tracking segments that may be used to identify patterns of behavior for the vessel. Further, as these patterns emerge, the vessel data processing sub-system may identify, with greater accuracy, any deviations from these patterns or other anomalies that may be indicative of other activities being performed by the vessel. The vessel data processing sub-system may record these patterns and anomalies within the entry for the vessel. As the vessel data processing sub-system processes newly obtained transponder data and other data from the publicly accessible databases for the vessels operating within the navigable area, the vessel data processing sub-system may continue to update the entries within the vessel insight database based on the output of processing the transponder data along with existing vessel tracking segments for these vessels.

Figure 8:
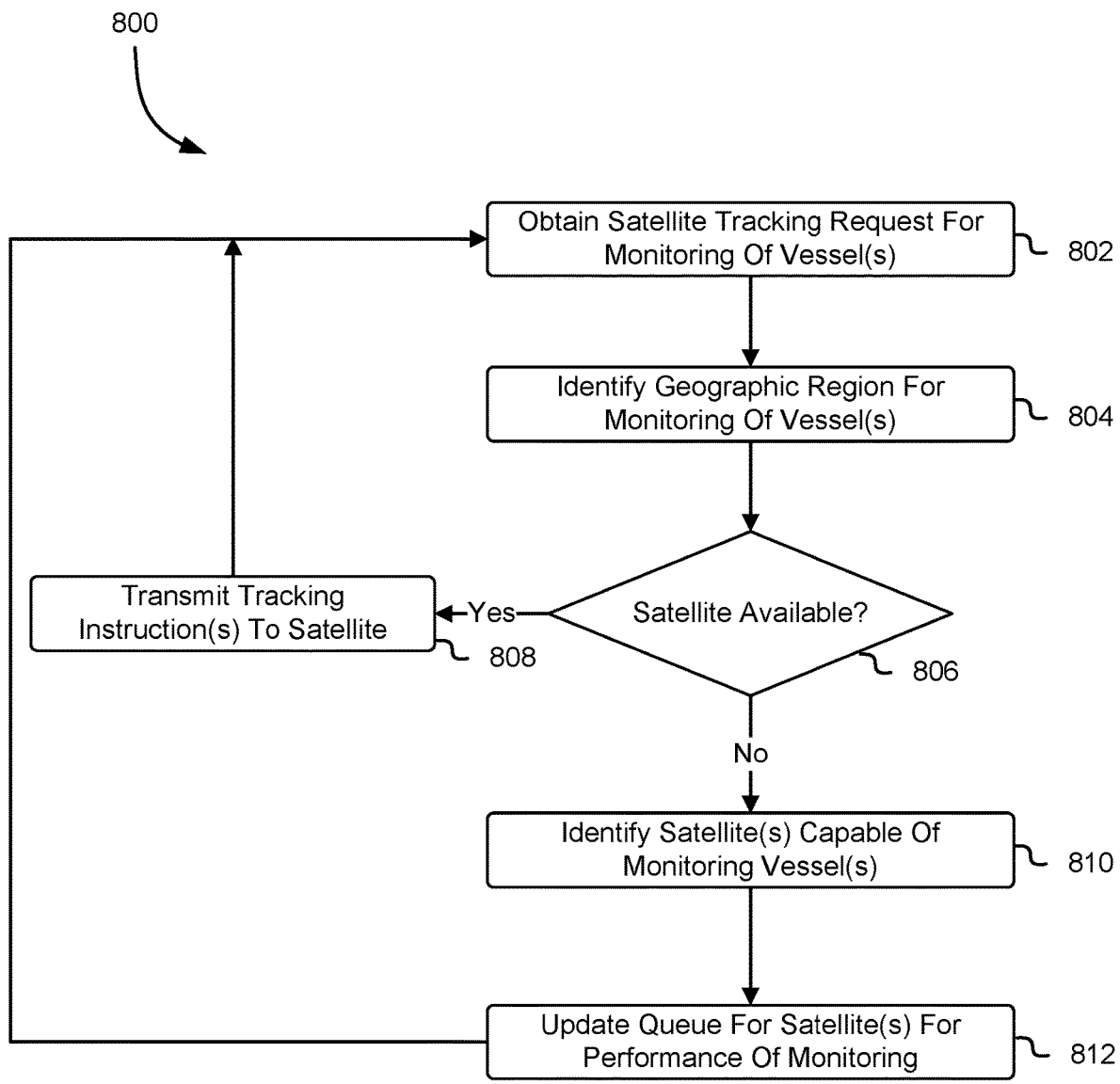
FIG. 8 shows an illustrative example of a process for transmitting executable instructions to a satellite for monitoring and tracking a vessel operating in a navigable area in response to a satellite tracking request in accordance with at least one embodiment.

FIG. 8 shows an illustrative example of a process 800 for transmitting executable instructions to a satellite for monitoring and tracking a vessel operating in a navigable area in response to a satellite tracking request in accordance with at least one embodiment. The process 800 may be performed by a satellite tracking system, which may process incoming satellite tracking requests from the vessel monitoring service or from other entities that may request utilization of satellites to monitor and track vessels within navigable areas. In an embodiment, the satellite tracking system obtains 802 a satellite tracking request for the monitoring and tracking of one or more vessels within a navigable area. The satellite tracking request may specify the real-time positioning data for a vessel that is to be monitored and tracked by the satellite tracking system. This real-time positioning data may include latitude and longitude coordinates for the vessel, as well as information specifying the time at which the vessel was at the provided coordinates and information specifying the last known heading of the vessel. In addition to the real-time positioning data, the request to the satellite tracking system may specify what kind of monitoring and tracking is to be performed by the satellite tracking system for the specified vessel. For instance, the request may specify that a satellite is to obtain photographic images of the vessel within the navigable area if the satellite detects any activity from the vessel within the navigable area. The request may also specify the length of time during which the satellite is to monitor and track the vessel within the navigable area. The request may also include executable instructions that cause the satellite tracking system to perform analysis of data obtained from a satellite to identify vessels within the area of interest within the navigable area and to identify any suspicious activity within the area of interest. The executable instructions may also be transmitted to the satellite, which may cause the satellite to stream the data collected by the satellite for processing.

Using the parameters of the request, the satellite tracking system may identify 804 the geographic region for monitoring of the one or more vessels specified in the request. As noted above, the request may include real-time positioning data for the one or more vessels that are to be monitored and tracked. The real-time positioning data may comprise GPS coordinates or other latitudinal/longitudinal coordinates. Further, the real-time positioning data may comprise heading and course information for each of the one or more vessels specified in the request. This heading and course information may be used by the satellite tracking system to estimate the probable location of a vessel at any given time. Thus, the satellite tracking system may utilize this real-time positioning data to identify the geographic region within which a satellite may be tasked to monitor and track these one or more vessels.

Based on the identified geographic region for monitoring of the one or more vessels, and the parameters of the request, the satellite tracking system may determine 806 whether a satellite from a fleet of satellites is available for monitoring and tracking the one or more vessels within the geographic region. For instance, the satellite tracking system may evaluate status and orbital information for each of the satellites in the fleet to determine whether a satellite is within or otherwise near the geographic region and is idle (e.g., not performing other tasks). If a satellite is available, the satellite tracking system may further determine whether the satellite may perform one or more operations for fulfillment of the request. For example, if the request includes a requirement for photographic images of the geographic region and/or of the one or more vessels, the satellite tracking system may determine whether the satellite may satisfy these requirements.

If a satellite is available for fulfillment of the request, the satellite tracking system may transmit 808 the parameters of the request, including any tracking instructions and other executable instructions for monitoring and tracking vessels within the geographic region, to the satellite. However, if a satellite is not immediately available for performance of operations associated with the request, the satellite tracking system may identify 810 one or more satellites that may be capable of monitoring and tracking the vessels within the identified geographic region. Further, the satellite tracking system may update 812 a queue for the identified satellites for performance of monitoring and tracking of the one or more vessels within the geographic region in accordance with the request. For instance, the satellite tracking system may update a queue of tasks with an entry corresponding to the tracking request provided by the vessel monitoring service. Each satellite of a fleet of satellites maintained by the satellite tracking system may query the queue to identify a task corresponding to a location within the immediate orbital path of the satellite. A satellite may evaluate the parameters of the task and perform a set of operations at the location specified.

Figure 9:
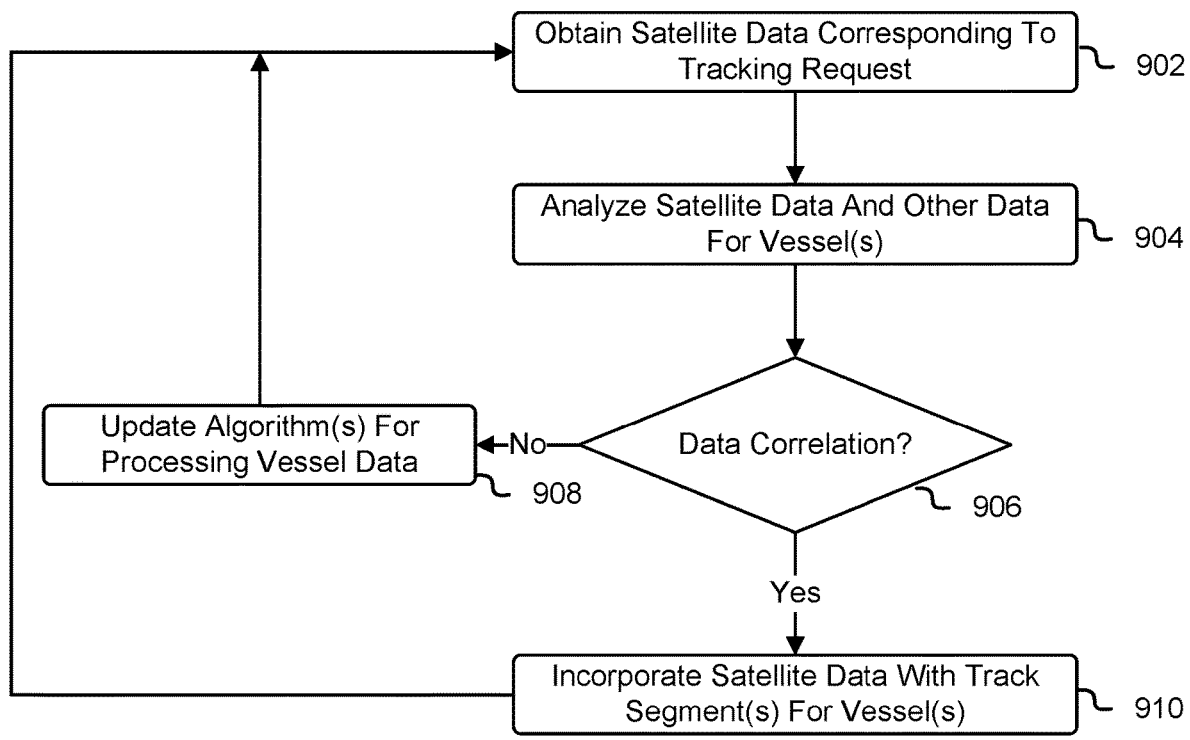
FIG. 9 shows an illustrative example of a process for utilizing satellite data obtained from a satellite to update algorithms used for processing incoming transponder data and the track segments corresponding to vessels monitored and tracked by the satellite in accordance with at least one embodiment.

FIG. 9 shows an illustrative example of a process 900 for utilizing satellite data obtained from a satellite to update algorithms used for processing incoming transponder data and the track segments corresponding to vessels monitored and tracked by the satellite in accordance with at least one embodiment. The process 900 may be performed by a vessel data processing sub-system of the vessel monitoring service, which may obtain satellite data from a satellite or from a satellite tracking system in response to a request to monitor and track one or more vessels within a particular navigable area or geographic region. In an embodiment, the vessel data processing sub-system obtains 902 satellite data corresponding to a request transmitted by the vessel data processing sub-system to a satellite tracking system for monitoring and tracking of one or more vessels. The satellite data may be obtained from the satellite tracking system or from the satellite that generated the data based on the monitoring and tracking of the one or more vessels and/or the monitoring of a particular area of interest within a navigable area. The satellite data may include photographic images of the one or more vessel, as well as any other data pertinent to identification of the one or more vessels and of any activities that may have been conducted by the one or more vessels within the geographic region (e.g., SAR readings, RF mappings, and/or other signals, etc.). Additionally, if the satellite was tasked with monitoring a particular geographic region or area of interest, the satellite data may include data specifying information of vessels that may have entered the particular geographic region or area of interest during the monitoring performed by the satellite.

The vessel data processing sub-system may analyze 904 the data obtained from the satellite, as well as other data previously generated for the one or more vessels using the machine learning system, to determine 906 whether there is a correlation between the satellite data and the data generated by the machine learning system. For instance, the vessel data processing sub-system may evaluate the classifications made by the machine learning system with regard to the activity characterization of a vessel and the course/heading of the vessel in comparison to the actual observed data from the satellite. As an illustrative example, if the machine learning system has classified a vessel as being engaged in an illicit activity, the vessel data processing sub-system may evaluate the obtained satellite data to determine whether this satellite data is also indicative of illicit activity.

If the vessel data processing sub-system determines that there is no data correlation between the satellite data and the other data generated by the machine learning system, the vessel data processing sub-system may update 908 the machine learning algorithms utilized for processing incoming transponder data and existing vessel tracking segments. For instance, the vessel data processing sub-system may use the satellite data to generate one or more sample vectors and process these through the machine learning system to determine whether the desired output is obtained. If not, the vessel data processing sub-system may adjust these algorithms until the desired output is obtained. However, if the vessel data processing sub-system determines that there is a correlation between the satellite data and the data generated using the machine learning system, the vessel data processing sub-system may incorporate 910 the satellite data into the existing tracking segments for the one or more vessels. This may result in greater accuracy in the data maintained by the vessel data processing sub-system. Further, this satellite data may be used to reinforce the machine learning algorithms to continue improving the accuracy of the machine learning system in generating the desired outputs.

Figure 10:
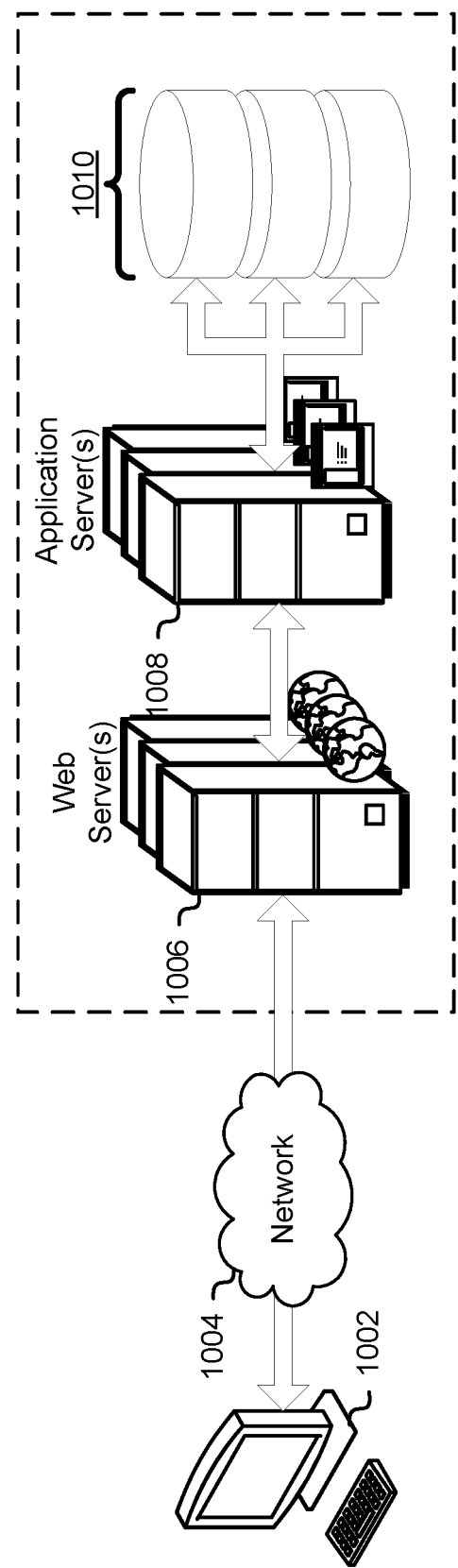
FIG. 10 shows an illustrative example of a system in which various embodiments can be implemented.

FIG. 10 illustrates aspects of an example system 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and convey information back to a user of the device. Examples of such client devices include personal computers, cell phones, handheld messaging devices, laptop computers, tablet computers, set-top boxes, personal data assistants, embedded computer systems, electronic book readers, and the like.

The system 1000 in one embodiment is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated in FIG. 10. Thus, the depiction in FIG. 10 should be taken as being illustrative in nature and not limiting to the scope of the disclosure.

The network 1004 can include any appropriate network, including an intranet, the Internet, a cellular network, a local area network, a satellite network or any other network, and/or combination thereof. Components used for such a system can depend at least in part upon the type of network and/or environment selected. Many protocols and components for communicating via such network 1004 are well known and will not be discussed in detail. Communication over the network 1004 can be enabled by wired or wireless connections and combinations thereof. In an embodiment, the network 1004 includes the Internet and/or other publicly-addressable communications network, as the system 1000 includes one or more web servers 1006 for receiving requests and serving content in response thereto, although for other networks an alternative device serving a similar purpose could be used as would be apparent to one of ordinary skill in the art.

The illustrative system 1000 includes one or more application servers 1008 and data storage 1010. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" or "data storage" refers to any device or combination of devices capable of storing, accessing, and retrieving data, which may include any combination and number of data servers, databases, data storage devices, and data storage media, in any standard, distributed, virtual, or clustered environment.

The one or more application servers 1008 can include any appropriate hardware, software and firmware for integrating with the data storage 1010 as needed to execute aspects of one or more applications for the electronic client device 1002, handling some or all of the data access and business logic for an application. The one or more application servers 1008 may provide access control services in cooperation with the data storage 1010 and is able to generate content including, text, graphics, audio, video, and/or other content usable to be provided to the user, which may be served to the user by the one or more web servers 1006 in the form of HyperText Markup Language (HTML), Extensible Markup Language (XML), JavaScript, Cascading Style Sheets (CSS), JavaScript Object Notation (JSON), and/or another appropriate client-side structured language. Content transferred to the electronic client device 1002 may be processed by the electronic client device 1002 to provide the content in one or more forms including forms that are perceptible to the user audibly, visually, and/or through other senses. The handling of all requests and responses, as well as the delivery of content between the electronic client device 1002 and the one or more application servers 1008, can be handled by the one or more web servers 1006 using PHP: Hypertext Preprocessor (PHP), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The data storage 1010 can include several separate data tables, databases, data documents, dynamic data storage schemes, and/or other data storage mechanisms and media for storing data relating to a particular aspect of the present disclosure. For example, the data storage 1010 may include mechanisms for storing various types of data and user information, which can be used to serve content to the electronic client device 1002. The data storage 1010 also is shown to include a mechanism for storing log data, such as application logs, system logs, access logs, and/or various other event logs, which can be used for reporting, analysis, or other purposes. It should be understood that there can be many other aspects that may need to be stored in the data storage 1010, such as page image information and access rights information, which can be stored in any of the above listed mechanisms as appropriate or in additional mechanisms in the data storage 1010. The data storage 1010 is operable, through logic associated therewith, to receive instructions from the one or more application servers 1008 and obtain, update, or otherwise process data in response thereto. The one or more application servers 1008 may provide static, dynamic, or a combination of static and dynamic data in response to the received instructions. Dynamic data, such as data used in web logs (blogs), shopping applications, news services, and other applications may be generated by server-side structured languages as described or may be provided by a content management system (CMS) operating on, or under the control of, the one or more application servers 1008.

In one embodiment, a user, through a device operated by the user, can submit a search request for a match to a particular search term. In this embodiment, the data storage 1010 might access the user information to verify the identity of the user and obtain information about items of that type. The information then can be returned to the user, such as in a results listing on a web page that the user is able to view via a browser on the electronic client device 1002. Information related to the particular search term can be viewed in a dedicated page or window of the browser. It should be noted, however, that embodiments of the present disclosure are not necessarily limited to the context of web pages, but may be more generally applicable to processing requests in general, where the requests are not necessarily requests for content.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via the network 1004. These devices also can include virtual devices such as virtual machines, hypervisors, and other virtual devices capable of communicating via the network 1004.

Various embodiments of the present disclosure utilize the network 1004 that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), and Common Internet File System (CIFS). The network 1004 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In embodiments utilizing the one or more web servers 1006, the one or more web servers 1006 can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The system 1000 can include a variety of data stores and other memory and storage media as discussed above. These can reside in a variety of locations, such as on a storage medium local to (and/or resident in) one or more of the computers or remote from any or all of the computers across the network 1004. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit (CPU or processor), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
   obtaining, from a vessel operating within a navigable area, transponder data for the vessel;
   evaluating the transponder data and a plurality of travel segments recorded for a plurality of vessels operating within the navigable area to identify a travel segment to which the transponder data corresponds, the travel segment representing a route through the navigable area;
   updating, using the transponder data, the travel segment to generate an updated travel segment;
   applying a machine learning model to the updated travel segment to calculate a determination that the vessel is engaged in an unauthorized activity within the navigable area, wherein the determination is based at least in part on a classification by the machine learning model of an input vector and a threshold value associated with the classification; and
   providing, based at least in part on the determination, an indication that the unauthorized activity is being performed by the vessel.

2. The computer-implemented method of claim 1, further comprising:
   transmitting, to a satellite tracking system that controls a plurality of satellites orbiting over the navigable area, a request to obtain satellite data for the vessel;
   obtaining the satellite data, the satellite data generated by a satellite of the plurality of satellites; and
   updating the machine learning model based on an evaluation of the satellite data and the updated travel segment.

3. The computer-implemented method of claim 1, further comprising:
   identifying, from a database, an entry corresponding to the vessel, the entry specifying baseline information for the vessel obtained from a publicly accessible database; and
   updating the baseline information for the vessel in the entry based on output of the machine learning model.

4. The computer-implemented method of claim 1, further comprising:
   obtaining, from a second vessel operating within the navigable area, second transponder data for the second vessel;
   determining, based on an evaluation of the second transponder data and the plurality of travel segments, that the second transponder data is corrupted; and
   as a result of the second transponder data being corrupted, discarding the second transponder data.

5. A system, comprising:
   one or more processors; and
   memory including executable instructions that, if executed by the one or more processors, cause the system to:
   obtain, from a vessel, data corresponding to a location of the vessel;
   evaluate the data and a plurality of travel segments recorded for a plurality of vessels to identify a travel segment to which the data corresponds;
   update, using the data, the travel segment to generate an updated travel segment;
   applying a machine learning model to the updated travel segment to determine, based on the updated travel segment, whether the vessel is engaged in an activity of a class of activities, wherein the determination is based at least in part on a classification by the machine learning model of an input vector and a threshold value associated with the classification; and
   in response to determining that the vessel is engaged in the activity, provide an indication that the vessel is engaged in the activity.

6. The system of claim 5, wherein the class of activities includes a set of activities that the plurality of vessels are unauthorized to engage in.

7. The system of claim 5, wherein the executable instructions further cause the system to:
   transmit, to a satellite tracking system, a request to obtain additional data related to the vessel, the request specifying the data of the vessel from the updated travel segment;
   obtain the additional data; and
   evaluate the additional data to determine whether a correlation is present between the additional data and the updated travel segment.

8. The system of claim 5, wherein the data corresponding to the location of the vessel is transponder data transmitted by the vessel to the system.

9. The system of claim 5, wherein the executable instructions that cause the system to determine whether the vessel is engaged in the activity further cause the system to apply a machine learning model to the updated travel segment to calculate a determination that the vessel is engaged in the activity.

10. The system of claim 5, wherein the executable instructions further cause the system to update baseline information specified in a database entry corresponding to the vessel based on the updated travel segment and a determination as to whether the vessel is engaged in the activity.

11. The system of claim 5, wherein the indication includes at least identifying information of the vessel, information regarding the activity, and coordinates corresponding to the location of the vessel.

12. The system of claim 5, wherein:
the data specifies a first identifier corresponding to a second vessel;
the travel segment specifies a second identifier corresponding to the vessel; and
the executable instructions that cause the system to evaluate the data and the plurality of travel segments further cause the system to:
determine that the vessel is associated with the second identifier corresponding to the vessel; and
associate the data with the second identifier corresponding to the vessel.

13. A non-transitory computer-readable storage medium having stored thereon executable instructions that, if executed by one or more processors of a computer system, cause the computer system to at least:
update, using data obtained from a vessel and corresponding to a location of the vessel, a travel segment identified from a plurality of travel segments resulting in an updated travel segment;
applying a machine learning model to the updated travel segment to determine, based on the updated travel segment, whether the vessel is engaged in an activity of interest, wherein the determination is based at least in part on a classification by the machine learning model of an input vector of and a threshold value associated with the classification; and
in response to the determination that the vessel is engaged in the activity of interest, provide an indication that the vessel is engaged in the activity of interest.

14. The non-transitory computer-readable storage medium of claim 13, wherein the data comprises transponder data transmitted using a transponder-based monitoring system.

15. The non-transitory computer-readable storage medium of claim 13, wherein the executable instructions that cause the computer system to provide the indication that the vessel is engaged in the activity of interest further cause the computer system to:
identify, based on location data of the updated travel segment, a location of the activity of interest; and
generate the indication, the indication specifying at least a set of coordinates corresponding to the location of the activity of interest.

16. The non-transitory computer-readable storage medium of claim 13, wherein the executable instructions that cause the computer system to determine whether the vessel is engaged in the activity of interest further cause the computer system to apply a machine learning model to the updated travel segment to calculate a determination, the determination specifying whether the vessel is engaged in the activity of interest.

17. The non-transitory computer-readable storage medium of claim 13, wherein the executable instructions further cause the computer system to:
transmit, to a satellite tracking system, a request to utilize a satellite to monitor and track the vessel at the location;
obtain, from the satellite tracking system, satellite data generated by the satellite, the satellite data comprising information usable to determine whether the vessel is engaged in the activity of interest; and
evaluate the satellite data to determine whether the vessel is engaged in the activity of interest.

18. The non-transitory computer-readable storage medium of claim 13, wherein the executable instructions further cause the computer system to update baseline information corresponding to the vessel obtained from a publicly accessible vessel database based on vessel data specified in the updated travel segment.

19. The non-transitory computer-readable storage medium of claim 13, wherein the executable instructions that cause the computer system to provide the indication further cause the computer system to transmit an alert to provide information that specifies a location of the activity of interest.

20. The non-transitory computer-readable storage medium of claim 13, wherein:
the data specifies a first identifier corresponding to a second vessel;
the travel segment specifies a second identifier corresponding to the vessel; and
the executable instructions that cause the system to update the travel segment further cause the system to:
determine that the vessel is associated with the second identifier corresponding to the vessel; and
provide a second indication that the vessel has provided an erroneous identifier.

* * * * *